United States Patent
Takei et al.

(10) Patent No.: US 7,829,222 B2
(45) Date of Patent: Nov. 9, 2010

(54) ARTIFICIAL GRAPHITE PARTICLES AND METHOD FOR MANUFACTURING SAME, NONAQUEOUS ELECTROLYTE SECONDARY CELL, NEGATIVE ELECTRODE AND METHOD FOR MANUFACTURING SAME, AND LITHIUM SECONDARY CELL

(75) Inventors: Kouichi Takei, Hitachi (JP); Hidetoshi Honbo, Hitachinaka (JP); Juichi Arai, Katsura-mura (JP); Manabu Kobayashi, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 984 days.

(21) Appl. No.: 10/470,076

(22) PCT Filed: Jan. 25, 2002

(86) PCT No.: PCT/JP02/00564

§ 371 (c)(1),
(2), (4) Date: Feb. 9, 2004

(87) PCT Pub. No.: WO02/059040

PCT Pub. Date: Aug. 1, 2002

(65) Prior Publication Data

US 2004/0115117 A1    Jun. 17, 2004

(30) Foreign Application Priority Data

| Jan. 25, 2001 | (JP) | 2001-017141 |
| Sep. 6, 2001 | (JP) | 2001-270099 |
| Nov. 7, 2001 | (JP) | 2001-341754 |

(51) Int. Cl.
*H01M 4/58* (2010.01)
*H01M 4/82* (2010.01)
*C01B 31/04* (2006.01)

(52) U.S. Cl. .................. 429/231.4; 423/448; 29/623.1
(58) Field of Classification Search ............. 429/231.4; 423/448; 29/623.1
See application file for complete search history.

(56) References Cited

U.S. PATENT DOCUMENTS 6,066,413 A    5/2000    Aymard et al.

FOREIGN PATENT DOCUMENTS

| EP | 0 890 549 A1 | 1/1999 |
| EP | 0890549 A1 * | 1/1999 |
| JP | 57-208079 | 12/1982 |
| JP | 04-368778 | 12/1992 |
| JP | 08-273666 | 10/1996 |

(Continued)

OTHER PUBLICATIONS

Supplemental European Search Report issued in corresponding application No. EP 02 71 6390 completed Apr. 13, 2006 and mailed Apr. 16, 2006.

(Continued)

*Primary Examiner*—Patrick Ryan
*Assistant Examiner*—Karie O'Neill Apicella
(74) *Attorney, Agent, or Firm*—Griffin & Szipl, P.C.

(57) ABSTRACT

Artificial graphite particles, having a secondary particle structure in which a plurality of primary particles composed of graphite are clustered or bonded together, and having a layer structure in which the edge portion of the primary particles is bent in a polyhedral shape.

19 Claims, 9 Drawing Sheets

FOREIGN PATENT DOCUMENTS

| JP | 10-158005 | 6/1998 |
| JP | 10-226506 | 8/1998 |
| JP | 10-312806 | 11/1998 |
| JP | 10-334915 | 12/1998 |
| JP | 10334915 A * | 12/1998 |
| JP | 11199211 | 7/1999 |
| JP | 11217266 | 8/1999 |
| JP | 11-263612 | 9/1999 |
| JP | 2000-058052 | 2/2000 |
| JP | 2000-223120 | 8/2000 |
| JP | 2000223120 A * | 8/2000 |
| JP | 2001-006669 | 1/2001 |
| WO | 98/29335 | 7/1998 |

OTHER PUBLICATIONS

Notice of Rejection in Japanese Patent Application No. 02804165.8 dated Mar. 25, 2005.

Ein-Eli, Yair at al, "The correlation between the cycling efficiency, surface chemistry and morphology of Li electrodes in electrolyte solutions based on methyl formate", Journal of Power Sources, vol. 54, 1995, pp. 281-288.

International Search Report, completed Mar. 29, 2002.

Salver-Disma, F. et al, "Physical characterization of carbonaceous materials prepared by mechanical grinding", Journal of Power Sources, vols. 81-82, 1999, pp. 291-295.

Office Action Issued on Apr. 15, 2008 in the Corresponding Japanese Application.

* cited by examiner

ARTIFICIAL GRAPHITE PARTICLES AND METHOD FOR MANUFACTURING SAME, NONAQUEOUS ELECTROLYTE SECONDARY CELL, NEGATIVE ELECTRODE AND METHOD FOR MANUFACTURING SAME, AND LITHIUM SECONDARY CELL

This is a National Phase Application in the United States of International Patent Application No. PCT/JP02/00564, filed Jan. 25, 2002, which claims priority on Japanese Patent Application No. P2001-017141 filed Jan. 25, 2001; Japanese Patent Application No. P2001-270099 filed Sep. 6, 2001; and Japanese Patent Application No. P2001-341754 filed Nov. 7, 2001, the entire disclosures of which are incorporated herein by reference.

TECHNICAL FIELD

This invention relates to artificial graphite particles and a method for manufacturing the same, to a nonaqueous electrolyte secondary cell negative electrode and method for manufacturing the same, and to a lithium secondary cell.

BACKGROUND ART

Graphite powders and so forth, such as natural graphite, artificial graphite produced by the graphitization of coke, and artificial graphite produced by the graphitization of an organic polymer or pitch, have been used as negative electrode active materials for conventional lithium secondary cells. Organic polymers are added as a binder to these graphite powders, organic solvents or water are added to create a paste, the surface of a copper foil collector is coated with this graphite paste, and the paste is dried to remove the solvent and produce a negative electrode for use in a lithium secondary cell. For example, as disclosed in Japanese Patent Publication No. S62-23433, the problem of internal shorting caused by dendritic precipitation of lithium is solved and the cycling characteristics are improved by using graphite for the negative electrode active material. However, although a lithium secondary cell in which graphite is used for the negative electrode does have better cycling characteristics than a lithium secondary cell in which metallic lithium or a lithium alloy is used for the negative electrode, the following two problems remain unsolved.

The first problem is that the electrolyte decomposes at the graphite surface during initial charging (the first reaction in which lithium is occluded in the graphite). A lithium secondary cell is charged and discharged through the occlusion and release of lithium between the positive and negative electrodes. For instance, in initial charging, if electricity corresponding to 20 units out of 100 units of lithium occluded in the positive electrode is consumed by electrolyte decomposition, this means that only 80 units of lithium end up being occluded in the negative electrode. If there is no electrolyte decomposition, the maximum 100 units of lithium can be utilized in charging and discharging, but in the above example, only a maximum of 80 units of lithium can be utilized, so the electrolyte decomposition reaction in initial charging contributes to lower cell capacity.

The second problem is that with natural graphite particles grown from graphite crystals, which is the to allow greater occlusion and release of lithium, or with artificial graphite particles produced by the graphitization of coke, the interlayer graphite bonds are broken by pulverization, resulting in graphite particles with a higher aspect ratio, which are referred to as flakes. These graphite flakes end up being oriented in the planar direction of a collector when kneaded with a binder and applied over the collector to produce an electrode. As a result, repeated occlusion and release of lithium into and out of the graphite particles causes the graphite layers to expand and contract, creating strain, which decreases adhesion between the oriented graphite particles and the collector, so cycling characteristics and quick charging and discharging characteristics suffer.

In regard to the first problem, suppressing electrolyte decomposition by covering the surface of the graphite with an amorphous carbon layer has been disclosed in Japanese Patent No. 2,643,035. For the second problem, the use of clustered graphite particles so that flat graphite particles will remain unoriented has been disclosed in Japanese Laid-Open Patent Application No. H10-158005, while the use of flake-like natural graphite modified particles having a cabbage-like appearance and a circularity of at least 0.86 has been disclosed in Japanese Laid-Open Patent Application No. H11-263612.

DISCLOSURE OF THE INVENTION

However, the technique disclosed in Japanese Patent No. 2,643,035, in which electrolyte decomposition is suppressed by covering the graphite surface with an amorphous carbon layer, does not necessarily result in a lithium secondary cell with large capacity. Graphite covered with amorphous carbon has a higher average charging and discharging voltage than uncovered graphite, so the amorphous carbon leads to new problems, such as a reduction in the amount of lithium occluded and released under practical usage conditions, and a reduction in the amount of negative electrode active material that can be packed because of a lower true specific gravity.

Meanwhile, with the technique disclosed in Japanese Laid-Open Patent Application No. H10-158005, involving the use of clustered graphite particles so that a plurality of flat graphite particles will remain unoriented, or the technique disclosed in Japanese Laid-Open Patent Application No. H11-263612, involving the use of flake-like natural graphite modified particles having a cabbage-like appearance and a circularity of at least 0.86, the electrolyte decomposition reaction cannot be suppressed in initial charging, so these approaches do not yield a lithium secondary cell with large capacity.

In view of this, it is an object of the present invention to provide artificial graphite particles and a method for manufacturing the same, with which the electrolyte decomposition reaction in initial charging is suppressed and irreversible capacity is reduced, without sacrificing the advantage of a graphite negative electrode of being capable of occluding and releasing a large amount of lithium, thereby increasing the capacity of a lithium secondary cell, and to provide a nonaqueous electrolyte secondary cell negative electrode in which these artificial graphite particles are used, and a method for manufacturing this electrode, as well as a lithium secondary cell that makes use of this nonaqueous electrolyte secondary cell negative electrode.

As a result of diligent research aimed at achieving the stated object, the inventors learned that in the electrolyte decomposition reaction that occurs in the initial charging of a graphite negative electrode, solvent molecules attempt to penetrate (cointercalate) between the graphite layers in a state of coordination with lithium ions, resulting in decomposition due to the large steric hindrance of the solvent molecules themselves (Journal of Power Sources, Vol. 54, p. 288 (1995)).

In view of this, in the present invention the inventors first improved the surface portion of the graphite where the lithium penetrates, so that the above-mentioned electrolyte decomposition reaction could be suppressed. Decomposition of electrolyte is believed to be most prevalent when the graphite crystallinity is high all the way up to near the surface, so the inventors attempted to render the surface of graphite particles amorphous. The electrolyte decomposition reaction was diminished by a method in which a carbonaceous material was mixed with graphite and recalcined, and a method in which the surface was coated with amorphous carbon by chemical vapor deposition (CVD). Nevertheless, new problems arose from the use of amorphous carbon. For example, the average charging and discharging voltage ended up higher than that of graphite and the amount of occluded and released lithium decreased under practical usage conditions, and the true specific gravity decreased, resulting in a reduction in the amount of negative electrode active material that could be packed. It was therefore found that the capacity of a lithium secondary cell could not be increased.

As a result of further investigation in light of the above, the inventors discovered that the object of the present invention could be achieved by using graphite particles in which the crystallinity is reduced in just the surface layer for the negative electrode material of a lithium secondary cell, in order to suppress the electrolyte decomposition reaction without sacrificing the advantage of higher capacity provided by graphite. It was also found that such graphite particles could be manufactured by a specific manufacturing method.

Specifically, the artificial graphite particles of the present invention are characterized by having a secondary particle structure in which a plurality of primary particles composed of graphite are clustered or bonded together, wherein the primary particles have a layer structure with a polyhedral edge portion.

The method for manufacturing artificial graphite particles of the present invention is characterized in that raw material graphite particles having a layer structure with a polyhedral edge portion are passed through a gap between two members positioned with this gap therebetween, on or both of which is rotating.

The nonaqueous electrolyte secondary cell negative electrode of the present invention has graphite particles that occlude or release alkali metal ions, affixed by an organic binder to a metal foil surface, wherein this nonaqueous electrolyte secondary cell negative electrode is characterized in that the above-mentioned graphite particles are composed of the above-mentioned artificial graphite particles of the present invention. The method of the present invention for manufacturing a nonaqueous electrolyte secondary cell negative electrode is a method for manufacturing a nonaqueous electrolyte secondary cell negative electrode having graphite particles that occlude or release alkali metal ions, wherein this method is characterized in that the above-mentioned graphite particles are manufactured by the above-mentioned method for manufacturing artificial graphite particles of the present invention.

The lithium secondary cell of the present invention has a laminate, produced by the successive lamination of a negative electrode capable of occluding and releasing lithium, a separator, and a positive electrode capable of occluding and releasing lithium, and a nonaqueous electrolyte in a container, characterized in that the above-mentioned negative electrodes comprise the negative electrode of the present invention.

BEST MODES FOR CARRYING OUT THE INVENTION

Artificial Graphite Particles

Figure 1:
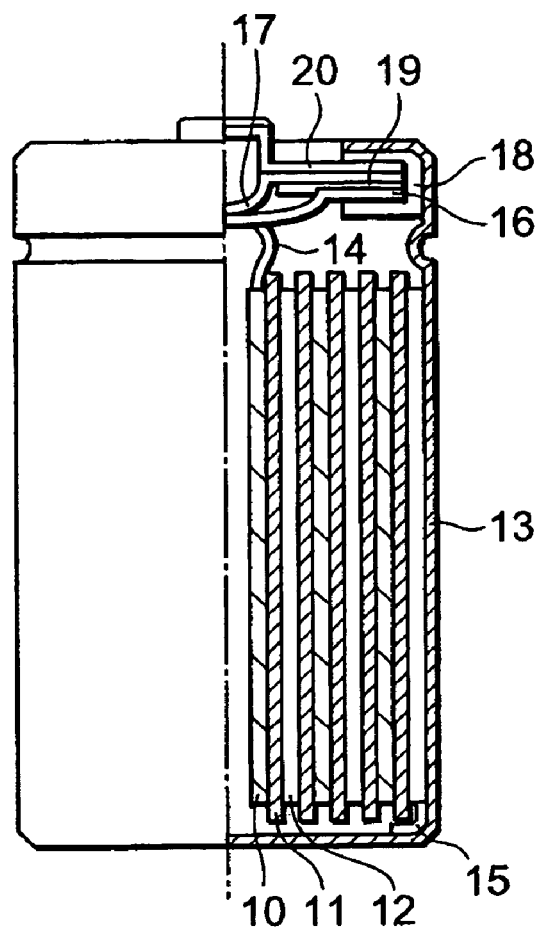
FIG. 1 is a cross section illustrating an example of a cylindrical lithium secondary cell of the present invention.

The artificial graphite particles of the present invention have a secondary particle structure in which a plurality of primary particles composed of graphite are clustered or bonded together, wherein the primary particles have a layer structure with a polyhedral edge portion.

It is known that in the penetration of lithium ions between graphite layers, solvent molecules coordinated with the lithium ions work their way in, resulting in the decomposition of the solvent, but when lithium penetrates the artificial graphite particles of the present invention having the above-mentioned structure, even if solvent molecules cointercalate between the graphite layers in a state of coordination with lithium, because the graphite layer at the edge portion is bent in a polyhedral shape, the graphite layers spread out more readily than in graphite with high crystallinity, and therefore there is less effect of steric hindrance and solvent decomposition is minimized. Specifically, employing a structure in which the graphite layer at the edge portion is bent in a polyhedral shape suppresses the decomposition reaction of the solvent in the electrolyte and so forth in a nonaqueous electrolyte secondary cell. The above structure can be confirmed by transmission electron microscopy (TEM).

Therefore, when the artificial graphite particles of the present invention are used in the negative electrode of a nonaqueous electrolyte secondary cell negative electrode, there is less irreversible capacity in initial charging and discharging, the quick discharge load characteristics are excellent, and the cycling life is longer, among other advantages, and furthermore the charge receptability is improved. The reason for this is believed to be that in a lithium secondary cell, the lithium is deposited in dendrite form with a conventional negative electrode material during overcharging, whereas the deposition is in the form of particles or moss with the artificial graphite particles of the present invention, the effect of which is to enhance safety during overcharging.

In the artificial graphite particles of the present invention, it is preferable if the outermost surface of the secondary particles has a surface layer in a low-crystallinity or amorphous state. Because the edge portion of the primary particles is bent in a polyhedral shape with the artificial graphite particles of the present invention, as mentioned above, there are more crystal defects at the outermost surface, and the surface of the secondary particles tends to be in a state of low crystallinity (more crystal defects) or in some places even amorphous. This structure can also be confirmed by transmission electron microscopy (TEM), and the low crystallinity or amorphousness of the surface can be examined by Raman spectrum measurement.

The peak intensity ratio ($R=I_{1360}/I_{1580}$) between the peak ($I_{1360}$) near 1360 cm$^{-1}$ and the peak ($I_{1580}$) near 1580 cm$^{-1}$ in Raman spectrum measurement of the artificial graphite particles of the present invention is preferably $0.1 \leq R \leq 0.5$, with $0.1 \leq R \leq 0.4$ being more preferable, $0.1 \leq R \leq 0.3$ better yet, and $0.1 \leq R \leq 0.2$ particularly favorable. The peak near 1360 cm$^{-1}$ originates in the amorphous portion of the graphite particle surface, while the peak near 1580 cm$^{-1}$ seems to be attributable to the graphite crystal portion, and from such standpoints as the above-mentioned effect of suppressing solvent decomposition, it is preferable for the artificial graphite particles of the present invention to have a Raman peak intensity ratio attributable to the amorphous and graphite crystal portions to be with the range specified above.

In the artificial graphite particles of the present invention, it is preferable if the above-mentioned secondary particle structure is one in which a plurality of primary particles composed of graphite are clustered or bonded together in a non-parallel manner, the structure having voids inside the secondary particles.

The voids present inside the artificial graphite particles can be measured in terms of pore volume measured by mercury porosimetry, and it is preferable for the pore volume found by this method to be from 0.1 to 0.5 cm$^3$/g. The quick discharge characteristics will tend to be superior if the pore volume is within this range. If the pore volume is less than 0.1 cm$^3$/g, not enough electrolyte will be retained for use in the nonaqueous electrolyte secondary cell, and the quick discharge characteristics will suffer, but if 0.5 cm$^3$/g is exceeded, the binder that is mixed with the artificial graphite particles to form the nonaqueous electrolyte secondary cell negative electrode will get into the pores and reduce contact with the artificial graphite particles and the collector, making it less likely that the nonaqueous electrolyte secondary cell will have good cycling characteristics.

It is also preferable if the artificial graphite particles of the present invention have a bulk density of at least 0.8 g/cm$^3$. If the bulk density is at least this high, coating of electrodes for nonaqueous electrolyte secondary cells will be excellent and adhesion with the collector will be superior. Put another way, electrode coatability will tend to decrease if the bulk density is less than 0.8 g/cm$^3$. "Bulk density" as used herein refers to the value obtained by putting graphite particles in a vessel, repeatedly tapping the vessel until there is no further change in the particle volume, and then taking a measurement.

It is preferable if the specific surface area of the artificial graphite particles of the present invention is 3 to 6 m$^2$/g. The quick charging and discharging characteristics of the nonaqueous electrolyte secondary cell will tend to be better and safety higher if the specific surface area is within the above range. Specifically, the quick charging and discharging characteristics will tend to suffer if the specific surface area is less than 3 m$^2$/g, but cell safety will tend to decrease if 6 m$^2$/g is exceeded.

It is also preferable if the surface oxygen concentration is 1.0 to 4.0 atom % (and even more preferably, 1.0 to 3.0 atom %). The surface oxygen concentration can be measured by X-ray photon spectrometry (XPS). If the surface oxygen concentration is between 1.0 and 4.0 atom %, the stability of the electrode mix paste obtained by mixing the artificial graphite particles with a binder and a solvent, the affinity with the electrolyte in the nonaqueous electrolyte secondary cell, the adhesion with the binder, and so forth will all tend to be better, which affords better negative electrode characteristics in a nonaqueous electrolyte secondary cell.

If the surface oxygen concentration is less than 1.0 atom %, it will be difficult to improve electrode coatability and electrode adhesion, but if the surface oxygen concentration is over 4.0 atom %, the quick charging and discharging characteristics will tend to be inferior. Artificial graphite particles having a surface oxygen concentration within the above range can be easily obtained by the method for manufacturing artificial graphite particles of the present invention, which is described in detail below. This manufacturing method involves subjecting the raw material graphite particles to a grinding treatment (frictional pulverization treatment), and it is believed that a surface oxygen concentration within the above range is attained by the oxidation of the graphite particle surfaces by the surrounding oxygen and the heat generated by friction.

In the present invention, it is preferable if the artificial graphite particles meet all of the above conditions. Specifically, it is preferable if the bulk density is at least 0.8 g/cm$^3$, the specific surface area is 3 to 6 m$^2$/g, and the surface oxygen concentration as measured by X-ray photon spectrometry (XPS) is 1.0 to 4.0 atom %.

It is preferable with the artificial graphite particles of the present invention if weight reduction and heat generation occur at a temperature of at least 640° C., and the weight reduction caused by heating for 30 minutes at 650° C. is less than 3%, in thermogravimetric-differential thermal analysis (TG-DTA) under an air flow.

Because the weight reduction during the above-mentioned measurement is 5% or more with a conventional carbon material, the artificial graphite particles of the present invention undergo less weight reduction than a conventional carbon material. The carbon materials used in conventional lithium secondary cells have low graphite crystallinity and the crystals inside the particles contain numerous defects or undeveloped amorphous portions, which seems to be why the exothermic commencement temperature is lower and the weight reduction is greater than with the artificial graphite particles of the present invention. On the other hand, with the artificial graphite particles of the present invention, the crystallinity is high and only the outermost surface is bent in a polyhedral shape and rendered amorphous, which seems to be why the exothermic commencement temperature is higher and the weight reduction is less.

Artificial graphite particles that exhibit weight reduction such as this can be manufactured by the method for manufacturing artificial graphite particles of the present invention discussed below, and artificial graphite particles obtained in this way exhibit weight reduction and exothermic behavior at 640° C. or higher. In contrast, with the carbon materials used in conventional lithium secondary cells, exothermic behavior is noted at around 600° C., so the exothermic commencement temperature of the artificial graphite particles of the present invention is higher than that of conventional carbon materials.

It is preferable with the artificial graphite particles of the present invention if the average particle size is 10 to 50 μm, the true density is at least 2.2 g/cm$^3$, and the spacing d002 of the (002) plane in the graphite is less than 0.337 nm. If the average size of the artificial graphite particles is greater than 50 μm, the electrode surface will tend to be bumpy, which can lead to short-circuiting when used in a nonaqueous electrolyte secondary cell. On the other hand, if the average particle size is less than 10 μm, the specific surface area of the graphite particles will be larger, so electrode coatability will decrease, and microparticles will tend to lower the safety of the cell. If the true density is less than 2.2 g/cm$^3$ and d002 is 0.337 nm or higher, this means that the crystallinity of the graphite is low, and there will be a reduction in the amount of lithium that can be occluded and released, so the charging and discharging capacity of the lithium secondary cell negative electrode will tend to decrease.

It is preferable if the viscosity of a paste (electrode mix paste) obtained by kneading the artificial graphite particles with the following binder (a) and solvent (b) is 0.3 to 1.6 Pa·s (more preferably 0.6 to 1.3 Pa·s, and even more preferably 1.0 to 1.3 Pa·s) at a temperature of 25° C. and a shear rate of 4 sec$^{-1}$.

(a) Polyvinylidene fluoride, where the weight ratio of the binder to the artificial graphite particles is 1:9, and the polyvinylidene fluoride is a polyvinylidene fluoride that exhibits a solution viscosity of 550±100 mPa·s when 12.0±0.5 wt % N-methyl-2-pyrrolidone solution is produced.

(b) N-methyl-2-pyrrolidone, in a weight of 45% with respect to the total amount of the paste.

An example of the above-mentioned polyvinylidene fluoride (a) is Polyvinylidene Fluoride #1120 made by Kureha Chemical. The viscosity of the electrode mix paste in the present invention is measured by the following method. An electrode mix paste is produced by mixing graphite particles and polyvinylidene fluoride (#1120 from Kureha Chemical) in a weight ratio of 90:10 and adding N-methyl-2-pyrrolidone so that the combined solids concentration of the graphite particles and the polyvinylidene fluoride will be 45 wt %, and the viscosity is measured with a Brookfield Model DV-III at 25° C. and a shear rate of 4 sec$^{-1}$.

When a nonaqueous electrolyte secondary cell negative electrode is produced using artificial graphite particles in which the viscosity of the electrode mix paste is over 1.6 Pa·s, a large amount of solvent has to be used to adjust the viscosity for coating, which raises the solvent cost and requires more time and energy in the drying of the electrode, and electrode adhesion also decreases, among other problems. On the other hand, if the viscosity of the electrode mix paste is less than 0.3 Pa·s, when the resulting artificial graphite particles are used to produce a nonaqueous electrolyte secondary cell negative electrode and then used in a nonaqueous electrolyte secondary cell, discharge load characteristics tend to suffer.

It is preferable if a paste has a shear rate dependence (TI) of the viscosity at 25° C. of 2.0 to 4.0 (with 2.0 to 3.5 being even better, and 2.6 to 3.0 being especially good), the paste being obtained by kneading the artificial graphite particles with the following binder (a) and solvent (b) and the paste having a viscosity of 1.0 Pa·s at 25° C. and a shear rate of 4 sec$^{-1}$, where TI is defined by the formula TI=(viscosity at shear rate of 4 sec$^{-1}$)/(viscosity at shear rate of 40 sec$^1$).

(a) Polyvinylidene fluoride, where the weight ratio of the binder to the artificial graphite particles is 1:9, and the polyvinylidene fluoride is a polyvinylidene fluoride that exhibits a solution viscosity of 550±100 mPa·s when 12.0±0.5 wt % N-methyl-2-pyrrolidone solution is produced.

(b) N-methyl-2-pyrrolidone.

An example of the above-mentioned polyvinylidene fluoride (a) is Polyvinylidene Fluoride #1120 made by Kureha Chemical. The shear rate dependence (TI) in the present invention is measured by the following method. An electrode mix paste is produced by mixing graphite particles and polyvinylidene fluoride (#1120 from Kureha Chemical) in a weight ratio of 90:10 and adding N-methyl-2-pyrrolidone to this mixture so that the viscosity will be 1.0 Pa·s at 25° C. and a shear rate of 4 sec$^{-1}$ as measured with a measured with a Brookfield Model DV-III. The viscosity of the electrode mix paste thus obtained is measured at 25° C. and a shear rate of 4 sec$^{-1}$ along with the viscosity at 25° C. and a shear rate of 40 sec$^{-1}$, and the shear rate dependence (TI) of the electrode mix paste viscosity is calculated from the above formula.

When a nonaqueous electrolyte secondary cell negative electrode is produced using artificial graphite particles with which the shear rate dependence (TI) is over 4.0, there may be a decrease in the smoothness of the produced negative electrode surface, and there may be separation in the coating surface at high speed, among other problems. On the other hand, if a nonaqueous electrolyte secondary cell negative electrode is produced using artificial graphite particles with which the shear rate dependence (TI) is less than 2.0, the discharge load characteristics in a cell tend to suffer.

Preferred embodiments of the artificial graphite particles of the present invention were described above, and it is preferable for the artificial graphite particles of the present invention to possess at least one of the preferred characteristics discussed above, and it is particularly favorable for it to possess all of these characteristics.

Method for Manufacturing Artificial Graphite Particles

The method for manufacturing artificial graphite particles of the present invention is characterized in that raw material graphite particles are passed through a gap between two members positioned with the gap therebetween, one or both of which is rotating. This manufacturing method allows the artificial graphite particles of the present invention having the above-mentioned characteristics to be manufactured with ease.

In the above-mentioned manufacturing method, it is preferable if the raw material graphite particles are passed through the gap between two members disposed with their planes facing each other and with the desired gap therebetween, with at least one of the members rotating relatively, so that at least the surfaces of the raw material graphite particles are subjected to a grinding treatment.

Furthermore, it is preferable if the raw material graphite particles are supplied in between a fixed member and a rotating rotary member disposed at the lower part of the fixed member, these members being disposed with their planes facing each other and with the desired gap therebetween, through the feed port of the fixed member, provided at a location corresponding to the rotational center of the rotary member, and made to pass through this gap, thereby subjecting at least the surfaces of the artificial graphite particles to a grinding treatment.

It is preferable if the two members rotate in opposite directions in the above-mentioned manufacturing method. There are no particular restrictions on the material of these two members, but a ceramic material such as alumina, silicon carbide, or silicon nitride is favorable in that there is less impurity contamination of the treated graphite particles.

A mortar type of grinding apparatus comprising two (upper and lower) grinders with which the gap between the two plates can be adjusted, for example, can be used to implement the above manufacturing method. With this apparatus, for example, the raw material is centrifugally fed into the gap between the upper and lower grinders, and the raw material graphite particles can be subjected to a grinding treatment (frictional pulverization) by the compression, shear, rolling friction, and so forth thus generated. Examples of commercially available apparatuses constructed as above include the mortar pulverizer (Glow Mill) made by Glow Engineering, the Premax made by Chuo Kakoki Shoji, and the Serendipiter and Super Masscolloider made by Masuko Sangyo.

In the method for manufacturing artificial graphite particles of the present invention, it is preferable if the size of the gap between the two members is 0.5 to 20 times the average size of the raw material graphite particles. The average particle size can be measured with a particle size distribution measurement apparatus that makes use of laser light scattering (such as the SALD-3000 made by Shimadzu Seisakusho). The size of the gap between the members is controlled as the clearance between the upper and lower members (such as the plates of grinders or the like), and can be set as desired, with zero being the point at which the upper and lower members lightly touch. If the gap between the members is less than 0.5 times the average particle size, the particles will be overly fine, which tends to make it difficult to manufacture the artificial graphite particles of the present invention having the characteristics described above. On the other hand, the effect of the grinding treatment will tend to be diminished if the clearance between the members is more than 20 times the average particle size.

Also, the speed of the two members as the graphite particles are passed through the gap between the members, one or both of which are rotating, along with the gap between the rotating members and the size (diameter) of the members, affects the rate at which the raw material graphite particles are ground. As this speed rises, so does the grinding rate. There are no particular restrictions on this speed in the present invention, but an outer peripheral speed (if the members are disks) of 15 to 40 m/sec is favorable. The grinding rate and the manufacturing efficiency will both tend to decrease if the outer peripheral speed is too low.

In the present invention, the grinding treatment in which the raw material graphite particles are passed through a gap between two members that are positioned with a gap therebetween, one or both of which are rotating, can be performed in one or more passes. If the treatment consists of two or more passes, the bulk density can be increased more than with a single pass. In this case, the grinding treatment conditions (such as the size of the gap between the two members (one or both of which are rotating), the speed of the members, and the raw material feed rate) may be the same as or different from the conditions in the immediately preceding treatment.

The manufacturing method of the present invention can be either a dry or a wet process. "Dry process" as used herein is one in which the raw material graphite particles are passed through the gap between the two members (one or both of which are rotating), while "wet process" is one in which the raw material graphite particles are treated after being dispersed in a suitable solvent. A wet process requires that the artificial graphite particles in the solvent be separated after the treatment. Water or an organic solvent such as an alcohol can be used as this solvent. Compared to a wet process, a dry process affords a higher bulk density, and is therefore preferable because the resulting artificial graphite particles have better electrode coatability and electrode adhesion. Furthermore, a dry process entails no step of dispersing the raw material graphite particles in a solvent prior to the grinding treatment, and no step of separating the artificial graphite particles from the solvent after the grinding treatment, so the artificial graphite particles can be manufactured at lower cost.

In the manufacturing method of the present invention, it is preferable if the raw material graphite particles are massive artificial graphite. It is also preferable if the raw material graphite particles have a secondary particle structure in which a plurality of primary particles composed of graphite are clustered or bonded together, and the primary particles within the secondary particles have planes of orientation that are not parallel to each other. In this case, it is preferable if the aspect ratio of the primary particles is 5 or less.

It is particularly favorable if the raw material graphite particles have a structure in which a plurality of flat graphite particles are clustered or bonded together in a non-parallel manner, the aspect ratio is 5 or less (preferably 1 to 3), and there are voids in the particles. The aspect ratio is found by measuring the minor and major diameters of individual particles in an SEM photograph of the graphite particles, and finding the ratio of the major diameter to the minor diameter. Any 100 particles are selected and the ratio found as above, and the average thereof is determined as the aspect ratio.

Massive raw material graphite particles already having voids in the interior of the particles are obtained by combining a graphitizable aggregate, a graphitization catalyst, and a binder that will bind these together, then pre-calcining and graphitizing this mixture. Fluid coke, needle coke, and various other types of coke can be used as the graphitizable aggregate. It is also possible to use natural or artificial graphite that has already been graphitized. The binder can be petroleum, coal, artificial pitch, or tar, and a material that can be graphitized in the same manner as the aggregate is preferred. The graphitization catalyst can be a carbide, oxide, or nitride of silicon, iron, nickel, titanium, boron, or the like.

The pre-calcination and graphitization are preferably carried out in an atmosphere in which the aggregate and the binder will not readily oxidize, such as a nitrogen atmosphere, an argon atmosphere, or a vacuum. The pre-calcination should be performed at a temperature of 400 to 1000° C., and the graphitization at a temperature of at least 2000° C. At the same time, the graphitization catalyst is eliminated at a temperature of 2000° C. or higher, and pores are formed in its place. It is even better for the graphitization temperature to be 2500° C. or higher, and 2800° C. or higher is best because it yields graphite with high crystallinity. If the graphitization temperature is under 2000° C., the development of graphite crystals will be poor, and the graphitization catalyst will remain behind in the graphite particles, which will tend to lower the charging and discharging capacity.

The amount in which the graphitization catalyst is added is preferable 1 to 50 weight parts per combined 100 weight parts of graphitizable aggregate or graphite and graphitizable binder. If the amount is less than 1 weight part, development of artificial graphite particle crystals will be poor and the charging and discharging capacity will tend to be lower when the particles are used in a nonaqueous electrolyte secondary cell. On the other hand, if the amount is over 50 weight parts, uniform mixing will be difficult and the material will tend to be more difficult to work with.

Because the graphitized material obtained as above is in the form of a block, it is preferably first pulverized. There are no particular restrictions on the pulverization method, but a jet mill, vibrating mill, hammer mill, or the like can be used. The average particle size after pulverization should be 100 μm or less, with a range of 10 to 50 μm being preferable because coatability will be better. Also, the pulverized powder may be subjected to cold hydrostatic pressing if needed. The massive artificial graphite manufactured as above is preferably used as the raw material graphite particles.

Nonaqueous Electrolyte Secondary Cell Negative Electrode, and Method for Manufacturing this Electrode The nonaqueous electrolyte secondary cell negative electrode of the present invention has graphite particles that occlude or release alkali metal ions, affixed by an organic binder to a metal foil surface, wherein this nonaqueous electrolyte secondary cell negative electrode is characterized in that the above-mentioned graphite particles are composed of the artificial graphite particles of the present invention described above. In this case, it is preferable if the artificial graphite particles of the present invention have been manufactured by the above-mentioned method of the present invention for manufacturing artificial graphite particles.

When a negative electrode such as this is applied to a nonaqueous electrolyte secondary cell, the electrolyte (such as a solution obtained by dissolving $LiPF_6$ in an amount of 1 mol/dm$^3$ in a mixed solvent of ethylene carbonate (EC) and ethyl methyl carbonate (EMC) with a volumetric ratio of 1:1) is less prone to decomposition. Also, the discharge capacity of the nonaqueous electrolyte secondary cell is higher and the irreversible capacity can be reduced.

The present invention provides a method for manufacturing a nonaqueous electrolyte secondary cell negative electrode having graphite particles that occlude or release alkali metal ions, wherein this method for manufacturing a nonaqueous electrolyte secondary cell negative electrode is characterized in that the above-mentioned graphite particles are manufactured by the above-mentioned method for manufacturing artificial graphite particles of the present invention. This manufacturing method allows a nonaqueous electrolyte secondary cell negative electrode exhibiting the above-mentioned characteristics to be obtained with ease.

Lithium Secondary Cell

The lithium secondary cell of the present invention has a laminate, produced by the successive lamination of a negative electrode capable of occluding and releasing lithium, a separator, and a positive electrode capable of occluding and releasing lithium, and a nonaqueous electrolyte in a container, wherein this lithium secondary cell is characterized in that the above-mentioned negative electrode is composed of the above-mentioned nonaqueous electrolyte secondary cell negative electrode of the present invention. In this case, it is preferable if the lithium occluded on the surface of the graphite particles is deposited in the form of particles or moss (this refers to a state in which the deposited lithium metal covers the negative electrode material particles substantially uniformly).

When the lithium is deposited in the form of particles or moss, there is very little irreversible capacity in initial charging and discharging, the quick discharge load characteristics are excellent, and the charging and discharging cycling life is long, among other such advantages, and furthermore charge receptability tends to be improved.

FIG. 1 is a cross section illustrating an example of a lithium secondary cell in which the artificial graphite particles of the present invention are used in the negative electrode. A positive electrode 10, a separator 11, and a negative electrode 12 are housed in a cell can 13 in a state of being coiled such that the positive electrode 10, the separator 11, and the negative electrode 12 are laminated in that order. A positive electrode tab 14 is attached to the positive electrode 10, a negative electrode tab 15 is attached to the negative electrode 12, the positive electrode tab 14 is connected to a cell inner lid 16, and the negative electrode tab 15 is connected to the cell can 13. A safety valve (current shut-off valve) 17 is connected to the cell inner lid 16. If the internal pressure rises over 10 atmospheres, the safety valve (current shut-off valve) 17 is deformed until it is electrically isolated from the cell inner lid 16. A cell outer lid 20, the safety valve (current shut-off valve) 17, an insulating plate 19, and the cell inner lid 16 are laminated at their ends in this order and held in place by a gasket 18.

Figure 2:
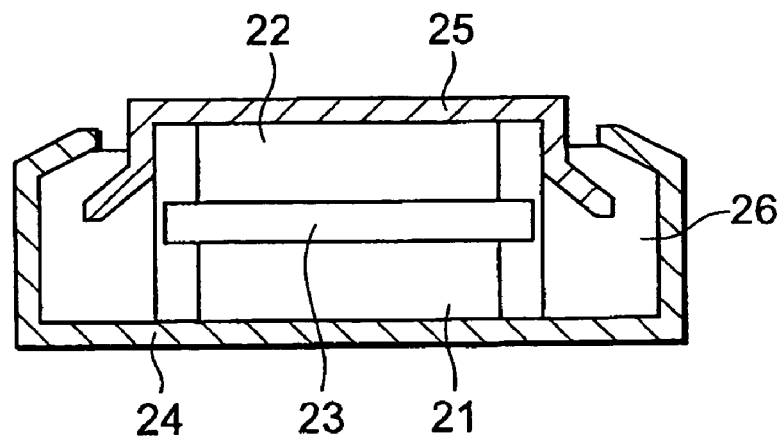
FIG. 2 is a cross section illustrating an example of a button-type lithium secondary cell of the present invention.

FIG. 2 is a cross sectional front view illustrating an example of a button-type lithium secondary cell in another example of the present invention. A pellet-shaped positive electrode 21 and a pellet-shaped negative electrode 22 are laminated with a separator 23 in between, the positive and negative electrodes touch a positive electrode can 24 and a negative electrode can 25, respectively, to effect electrical conduction, and the positive electrode can and the negative electrode can are sealed with a gasket 26.

The negative electrode used in the lithium secondary cell of the present invention is obtained by adding an organic binder to the artificial graphite particles of the present invention and kneading and molding this mixture into the form of a sheet, pellet, or the like. Examples of organic binders include polyethylene, polypropylene, ethylene propylene polymer, butadiene rubber, styrene butadiene rubber, and butyl rubber. Polyvinylidene fluoride, polyethylene oxide, polyepichlorohydrin, polyphosphazene, polyacrylonitrile, and other such macromolecular compounds capable of conducting lithium ions are also suitable as this organic binder. The organic binder is preferably contained in an amount of 1 to 20 weight parts per 100 weight parts of the mixture of artificial graphite particles and organic binder.

A sheet-form negative electrode can be manufactured by adding water or an organic solvent to the mixture of artificial graphite particles and organic binder to create a paste, adjusting the paste viscosity, then coating a collector with this paste and drying to remove the solvent, then press molding with a roll press or the like.

A foil, mesh, or the like of copper, nickel, stainless steel, or the like can be used as the collector. The pellet-shaped negative electrode can be manufactured by press molding the mixture of artificial graphite particles and organic binder in a metal mold.

Meanwhile, there are no particular restrictions on the active material used for the positive electrode in the lithium secondary cell of the present invention, but compounds expressed by the chemical formulas $LiM_xCo_{1-x}O_2$, $Li_{1+x}Mn_{2-x}O_4$, and $Li_{1+x}M_yMn_{2-x-y}O_4$ (M is one or more of Fe, Ni, Cr, Mn, Al, B, Si, and Ti, $x \geq 0$, and $y \geq 0$) can be used to particular advantage. A sheet- or pellet-form positive electrode can be manufactured in the same manner as the negative electrode using the above-mentioned active material. A foil or mesh of aluminum, however, is used for the collector.

The solvent of the organic electrolyte used in the lithium secondary cell of the present invention is a mixed solvent obtained by adding one or more members of the group consisting of dimethyl carbonate, diethyl carbonate, ethyl methyl carbonate, γ-butyrolactone, sulfolane, methyl acetate, ethyl acetate, methyl propionate, ethyl propionate, dimethoxyethane, and 2-methyltetrahydrofuran to ethylene carbonate, and it is preferable for the volumetric percentage of the ethylene carbonate to be at least 0.1 and no more than 0.6. Meanwhile, one or more members of the group consisting of $LiPF_6$, $LiBF_4$, $LiAsF_6$, $LiClO_4$, $(C_2F_5SO_3)_2NLi$, and $(CF_3SO_3)_2NLi$ are used as the lithium salt in the present invention, the concentration of which should be between 0.5 and 1.5 $mol/dm^3$.

The separator used in the lithium secondary cell of the present invention can be nonwoven cloth, woven cloth, microporous film, or a combination of these, whose main component is a polyolefin such as polyethylene or polypropylene. Of these, the use of a microporous film made of polyethylene and having a thickness of 20 to 50 μm is preferable.

EXAMPLES

Preferred examples of the present invention will now be described in further detail, but the present invention is not limited to or by these examples.

Manufacture of Raw Material Graphite Particles and Measurement of Properties

Example 1a 100 weight parts of coke powder with an average particle size of 5 μm, 30 weight parts tar pitch, 30 weight parts of silicon carbide with an average particle size of 48 μm, and 20 weight parts coal tar were mixed for 1 hour at 270° C. The resulting mixture was pulverized, press molded into a pellet, and pre-calcined at 900° C. in nitrogen, after which this product was graphitized at 2800° C. in an Acheson furnace. The graphite block obtained above was pulverized in a hammer mill and passed through a 200-mesh standard sieve to produce massive raw material graphite particles.

Next, using a Masscolloider (MK10-15J) made by Masuko Sangyo and equipped with an MKGC10-120 grinder, and with the grinder gap (clearance) set to 60 μm (with zero being the point at which the upper and lower member slightly touch), the above-mentioned raw material graphite particles were subjected to a grinding treatment by being passed through this gap, which yielded the artificial graphite particles of the present invention. With the upper grinder stationary, the lower grinder was rotated at 1500 rpm, and the raw material graphite particles were fed through a feed port provided to the upper grinder in the portion corresponding to the center of the lower grinder. The artificial graphite particles went through two passes of this treatment, and the upper and lower grinders have fine bumps on the opposing surfaces.

The raw material graphite particles and the artificial graphite particles of the present invention were examined for the following properties (1) to (10). Both types of particles were also examined by electron microscope (SEM) as discussed below.

(1) Average particle size: measured with a Shimadzu Seisakusho laser diffraction particle size distribution measurement apparatus (SALD-3000).

(2) Aspect ratio: the ratio of major diameter to minor diameter was found for 100 randomly selected graphite particles by scanning electron microscopic (SEM) observation, and the average thereof was used as a representative value.

(3) True density: Measured by the butanol method set forth in JIS R 7212.

(4) Bulk density: A sample was put in a 200 mL glass graduated cylinder and tapped until there was no further change, at which point the sample volume was measured, and this was divided by the sample weight.

(5) Graphite interlayer spacing (hereinafter referred to as spacing d002): The (002) spacing d002 of the graphite was measured using a Philips X-ray diffractometer PW1730 (goniometer PW1050), with the Cu-Kα line rendered monochromatic with a Ni filter, and with high-purity silicon used as an internal standard sample.

(6) Specific surface area: This was calculated by BET method after using a Micromeritics ASAP2010 to measure the nitrogen absorption at the temperature of liquid temperature by multi-point method.

(7) Pore volume: Pores within a range of 10 to $10^5$ nm were measured by mercury porosimetry using an Autoscan 33 made by Yuasa Ionics.

(8) Raman spectrum intensity ratio (hereinafter also referred to as "peak intensity ratio ($R=I_{1360}/I_{1580}$)"): A sample was mixed with KBr powder and molded into tablets, and a Renishaw Raman scope (excitation wavelength: 532 nm, laser power: 60 mW, laser irradiation system: macro-sample chamber 135° irradiation unit, light splitter: single polychrometer, detector: CCD, incident slit width: 100 μm, measurement time: exposure time 15 minutes) was used to find the peak intensity ratio ($R=I_{1360}/I_{1580}$) between the peak ($I_{1360}$) near 1360 $cm^{-1}$ and the peak ($I_{1580}$) near 1580 $cm^{-1}$.

(9) Surface oxygen concentration: Measurement was made with an AXIS-165 made by Shimadzu Seisakusho Kratos (monochromatic Al-Kα, 30 to 150 W (15 kV, 2 to 10 mA), measured area: 0.3×0.7 $mm^2$, quantitative analysis PE: 10 eV, qualitative analysis PE: 160 eV, detector uptake angle: 90°, sample: electrode prior to charging and discharging test), the peak sensitivity coefficient of each measured element was divided by the peak surface area of each element and these quotients were summed, and the ratio of the quotient obtained by dividing the peak sensitivity coefficient of oxygen by the peak surface area of oxygen with respect to the above-mentioned sum was calculated.

(10) Electrode mix paste viscosity: An electrode mix paste was produced by mixing graphite particles and polyvinylidene fluoride (#1120 made by Kureha) in a weight ratio of 90:10 and adding N-methyl-2-pyrrolidone so that the combined solids concentration of the graphite particles and the polyvinylidene fluoride would be 45 wt %, and the viscosity of the electrode mix paste was measured with a Brookfield Model DV-III at 25° C. and a shear rate of 4 $sec^{-1}$.

Table 1 shows the various property values of the raw material graphite particles and the artificial graphite particles of the present invention. It can be seen that the bulk density increased, the peak intensity ratio ($R=I_{1360}/I_{1580}$) increased, the surface oxygen concentration increased, and the electrode mix paste viscosity decreased in the artificial graphite particles of the present invention compared to those of the raw material graphite particles. Furthermore, the electrode mix paste viscosity was measured using electrode coatability and electrode adhesion as indices, and with the artificial graphite particles of the present invention, the paste viscosity was lower, the electrode coatability was better, and the electrode adhesion was improved as compared to the raw material graphite particles.

TABLE 1

| | Example 1a | |
|---|---|---|
| | Raw material graphite particles | Graphite particles |
| Average particle size (μm) | 22.5 | 19.7 |
| Aspect ratio | 2.5 | 1.8 |
| True density (g/cm$^3$) | 2.242 | 2.242 |
| Bulk density (g/cm$^3$) | 0.71 | 0.93 |
| Spacing d002 (nm) | 0.335 | 0.335 |
| Specific surface area (m$^2$/g) | 3.6 | 3.7 |
| Pore volume (cm$^3$/g) | 0.87 | 0.5 |
| Peak intensity ratio (R = $I_{1360}/I_{1580}$) | 0.09 | 0.25 |
| Surface oxygen concentration (atom %) | 0.5 | 1.9 |
| Electrode mix paste viscosity (Pa·s) | 2.40 | 0.56 |

Example 1d 100 weight parts of coke powder with an average particle size of 5 μm, 40 weight parts tar pitch, 25 weight parts of silicon carbide with an average particle size of 48 μm, and 20 weight parts coal tar were mixed for 1 hour at 270° C. The resulting mixture was pulverized, press molded into a pellet, and pre-calcined at 900° C. in nitrogen, after which this product was graphitized at 3000° C. in an Acheson furnace. The graphite block obtained above was pulverized in a hammer mill and passed through a 200-mesh standard sieve to produce massive raw material graphite particles.

Next, using a Masscolloider (MK10-15J) made by Masuko Sangyo and equipped with an MKGC10-120 grinder, and with the grinder gap (clearance) set to 40 μm (with zero being the point at which the upper and lower members lightly touch), the above-mentioned raw material graphite particles were subjected to a grinding treatment by being passed through this gap, which yielded the artificial graphite particles of the present invention. With the upper grinder stationary, the lower grinder was rotated at 1500 rpm, and the graphite particles went through one pass of this treatment.

Examples 1e to 1g

The artificial graphite particles of the present invention were obtained in the same manner as in Example 1d, except that the grinder gap was changed to 80 μm, 200 μm, and 300 μm in the various examples.

The properties (1) to (10) of the artificial graphite particles of the present invention obtained in Examples 1d to 1 g were examined in the same manner as in Example 1a. Table 2 shows the various property values of the artificial graphite particles of the present invention in Examples 1d to 1 g.

TABLE 2

| | Example 1d | Example 1e | Example 1f | Example 1g |
|---|---|---|---|---|
| Grinder gap setting (μm) | 40 | 80 | 200 | 300 |
| Grinder gap size versus average particle size of raw material graphite particles (times) | 1.9 | 3.7 | 9.3 | 14 |
| Average particle size (μm) | 19.8 | 20.0 | 21.0 | 21.2 |
| Aspect ratio | 1.7 | 1.8 | 1.9 | 2.0 |
| True density (g/cm$^3$) | 2.241 | 2.241 | 2.242 | 2.242 |
| Bulk density (g/cm$^3$) | 0.94 | 0.90 | 0.86 | 0.83 |
| Spacing d002 (nm) | 0.335 | 0.335 | 0.335 | 0.335 |
| Specific surface area (m$^2$/g) | 3.8 | 3.7 | 3.7 | 3.6 |
| Pore volume (cm$^3$/g) | 0.18 | 0.22 | 0.3 | 0.32 |
| Peak intensity ratio (R = $I_{1360}/I_{1580}$) | 0.29 | 0.20 | 0.15 | 0.10 |
| Surface oxygen concentration (atom %) | 2.4 | 2.0 | 1.2 | 1.1 |
| Electrode mix paste viscosity (Pa·s) | 0.50 | 0.60 | 0.80 | 0.80 |

It can be seen from Table 2 that with all of the artificial graphite particles of the present invention, the average particle size was between 10 and 50 μm, the true density was at least 2.2 g/cm$^3$, the spacing d002 of the (002) plane of the graphite was less than 0.337, the bulk density was at least 0.8 g/cm$^3$, the specific surface area was between 3 and 6 m$^2$/g, the pore volume as measured by mercury porosimetry was between 0.1 and 0.5 cm$^3$/g, the peak intensity ratio (R=$I_{1360}/I_{1580}$) between the peak ($I_{1360}$) appearing at 1360 cm$^{-1}$ and the peak ($I_{1580}$) appearing at 1580 cm$^{-1}$ measured by Raman spectroscopy was at least 0.1 and no more than 0.3 (0.1≦R≦0.3), and the surface oxygen concentration as measured by X-ray photon spectrometry (XPS) was between 1 and 3 atom %. Also, with the artificial graphite particles of the present invention, the electrode mix paste viscosity was lower and the electrode coatability and adhesion were both improved as compared to the raw material graphite particles shown in Table 1. Further, it can be seen that the electrode mix paste viscosity is particularly low (which is desirable) because the size of the grinder gap versus the average particle size of the raw material graphite particles was between 0.5 and 20 times in Examples 1d, 1e, 1f, and 1 g in Table 2.

Comparative Example 1a

The properties (1) to (10) of an artificial graphite powder with an average particle size of 25 μm were examined in the same manner as in Example 1a.

Comparative Example 1b 20 weight parts coal tar was added to 100 weight parts of a natural graphite powder with an average particle size of 25 μm and mixed for 1 hour at 270° C., after which the resulting mixture was pulverized. This mixed powder was press molded into a pellet and calcined at 900° C. in nitrogen to produce graphite particles comprising natural graphite covered by amorphous carbon. The properties (1) to (10) of the graphite particles thus obtained were examined in the same manner as in Example 1a.

Comparative Example 1c

The artificial graphite particles produced in Example 1a were treated in a ball mill, and the properties (1) to (10) of the graphite particles thus obtained were examined in the same manner as in Example 1a.

Comparative Example 1d

The artificial graphite particles produced in Example 1a were treated in a jet mill, and the properties (1) to (10) of the graphite particles thus obtained were examined in the same manner as in Example 1a. Table 3 shows the property values for the graphite particles in Comparative Examples 1a to 1d.

TABLE 3

|  | CE 1a | CE 1b | CE 1c | CE 1d |
|---|---|---|---|---|
| Average particle size (μm) | 25.0 | 30.0 | 14.6 | 12.7 |
| Aspect ratio | 2.8 | 2.0 | 2.4 | 2.4 |
| True density (g/cm$^3$) | 2.242 | 2.185 | 2.242 | 2.242 |
| Bulk density (g/cm$^3$) | 0.50 | 0.60 | 0.70 | 0.50 |
| Spacing d002 (nm) | 0.335 | 0.335 | 0.335 | 0.335 |
| Specific surface area (m$^2$/g) | 6.2 | 2 | 4.2 | 5.6 |
| Pore volume (cm$^3$/g) | <0.1 | <0.1 | <0.1 | <0.1 |

TABLE 3-continued

|  | CE 1a | CE 1b | CE 1c | CE 1d |
|---|---|---|---|---|
| Peak intensity ratio (R = $I_{1360}/I_{1580}$) | 0 | 0.50 | 0.32 | 0.45 |
| Surface oxygen concentration (atom %) | 0 | 0 | 0.09 | 0.09 |
| Electrode mix paste viscosity (Pa·s) | 2.00 | 1.50 | 1.80 | 1.90 |

[CE: Comparative Example]

It can be seen from Table 3 that with the graphite particles in the comparative examples, the peak intensity ratio (R=$I_{1360}/I_{1580}$) of the Raman spectrum was less than 0.1 or greater than 0.3. It can also be seen that the surface oxygen concentration was less than 1 atom % and the bulk density was less than 0.8 g/cm$^3$. A comparison of Tables 1, 2, and 3 reveals that the artificial graphite particles of the present invention had a lower electrode mix paste viscosity than in the comparative examples, so the electrode coatability was superior.

Examples 1h to 1k and Comparative Example 1e

Massive raw material graphite particles were produced in the same manner as in Example 1d. SEM photographs revealed that the raw material graphite particles thus obtained had a structure in which flat particles were clustered or bonded together with a plurality of orientation planes in a non-parallel manner. These raw material graphite particles were subjected to a grinding treatment using a Masscolloider (MK10-20J) made by Masuko Sangyo and equipped with a GA10-120 grinder, with the upper and lower grinder gap (clearance) set to 40 μm (Example 1h), 80 μm (Example 1i), 200 μm (Example 1j), and 300 μm (Example 1k) from the point where the upper and lower grinders lightly touched. The rotational speed of the lower grinder of the Masscolloider (MK10-20J) was 1500 rpm, and the graphite particles were passed through one time. The properties (1) to (10) of the raw material graphite particles in Example 1h (Comparative Example 1e) and of the artificial graphite particles of the present invention obtained in Examples 1h to 1k were examined in the same manner as in Example 1a. These property values are given in Table 4.

TABLE 4

|  | Example 1h | Example 1i | Example 1j | Example 1k | CE 1e |
|---|---|---|---|---|---|
| Grinder gap setting (μm) | 40 | 80 | 200 | 300 | N/A |
| Average particle size (μm) | 19.8 | 20.0 | 21.0 | 21.2 | 21.4 |
| Aspect ratio | 1.7 | 1.8 | 1.9 | 2.0 | 2.3 |
| True density (g/cm$^3$) | 2.241 | 2.241 | 2.242 | 2.242 | 2.242 |
| Bulk density (g/cm$^3$) | 0.94 | 0.90 | 0.86 | 0.83 | 0.73 |
| Spacing d002 (nm) | 0.335 | 0.335 | 0.335 | 0.335 | 0.335 |
| Specific surface area (m$^2$/g) | 3.8 | 3.7 | 3.7 | 3.6 | 3.5 |
| Pore volume (cm$^3$/g) | 0.18 | 0.22 | 0.30 | 0.32 | 0.85 |
| Peak intensity ratio (R = $I_{1360}/I_{1580}$) | 0.20 | 0.16 | 0.13 | 0.10 | 0.09 |
| Surface oxygen concentration (atom %) | 2.4 | 2.0 | 1.2 | 1.1 | 0.9 |
| Electrode mix paste viscosity (Pa·s) | 0.50 | 0.60 | 0.80 | 0.95 | 2.50 |

[CE: Comparative Example]

Examples 1o to 1t

Massive raw material graphite particles were produced in the same manner as in Example 1d. SEM photographs revealed that the raw material graphite particles thus obtained had a structure in which flat particles were clustered or bonded together with a plurality of orientation planes in a non-parallel manner. These raw material graphite particles were subjected to a grinding treatment using a Masscolloider (MKZA10-15J) made by Masuko Sangyo and equipped with an MKGC10-120 grinder. Here, the rotational speed of the lower grinder was 1500 rpm, and the upper and lower grinder gap (clearance) set to 40 μm (Examples 1o and 1p), 60 μm (Examples 1q and 1r), and 80 μm (Examples 1s and 1t) from the point where the upper and lower grinders lightly touched. In Examples 1p, 1r, and 1t, the graphite particles that had undergone a first grinding treatment were put back into the apparatus and subjected to one more grinding treatment.

The properties (1) to (10) of the artificial graphite particles of the present invention obtained in Examples 1o to 1t were examined in the same manner as in Example 1a. In addition, the shear rate dependence (TI) of the electrode mix paste viscosity was measured by the following method (11). These property values are compiled in Table 5.

(11) Shear rate dependence of electrode mix paste viscosity (hereinafter referred to as "TI"): An electrode mix paste was produced by mixing graphite particles and polyvinylidene fluoride (#1120 made by Kureha) in a weight ratio of 90:10 and adding N-methyl-2-pyrrolidone so that the viscosity of the electrode mix paste would be 1.0 Pa·s as measured with a Brookfield Model DV-III at 25° C. and a shear rate of 4 sec$^{-1}$. The viscosity of the resulting electrode mix paste at 25° C. and a shear rate of 4 sec$^{-1}$ and its viscosity at 25° C. and a shear rate of 40 sec$^{-1}$ were measured, the viscosity at 25° C. and a shear rate of 4 sec$^{-1}$ was divided by the viscosity at 25° C. and a shear rate of 40 sec$^{-1}$, and this quotient was termed the shear rate dependence of the electrode mix paste (TI).

TABLE 5

|  | Ex. 1o | Ex. 1p | Ex. 1q | Ex. 1r | Ex. 1s | Ex. 1t |
| --- | --- | --- | --- | --- | --- | --- |
| Grinder gap setting (μm) | 40 | 40 | 60 | 60 | 80 | 80 |
| Number of grinding treatments (times) | 1 | 2 | 1 | 2 | 1 | 2 |
| Average particle size (μm) | 19.5 | 18.9 | 19.8 | 19.3 | 20.0 | 19.8 |
| Aspect ratio | 1.7 | 1.6 | 1.7 | 1.7 | 1.8 | 1.7 |
| True density (g/cm$^3$) | 2.241 | 2.241 | 2.241 | 2.241 | 2.241 | 2.241 |
| Bulk density (g/cm$^3$) | 0.877 | 0.905 | 0.860 | 0.890 | 0.846 | 0.881 |
| Spacing d002 (nm) | 0.335 | 0.335 | 0.335 | 0.335 | 0.335 | 0.335 |
| Specific surface area (m$^2$/g) | 3.7 | 3.9 | 3.0 | 3.4 | 2.9 | 3.3 |
| Pore volume (cm$^3$/g) | 0.18 | 0.15 | 0.20 | 0.18 | 0.22 | 0.20 |
| peak intensity ratio (R = I$_{1360}$/I$_{1580}$) | 0.20 | 0.22 | 0.17 | 0.19 | 0.15 | 0.16 |
| Surface oxygen concentration (atom %) | 2.4 | 2.6 | 2.2 | 2.4 | 2.0 | 2.1 |
| Electrode mix paste viscosity (Pa·s) | 1.28 | 0.98 | 1.18 | 1.00 | 1.58 | 1.10 |
| TI of electrode mix paste viscosity | 3.0 | 2.6 | 3.0 | 2.7 | 3.2 | 2.8 |

Comparative Examples 1f and 1 g

The raw material graphite particles in Example 1o were termed Comparative Example 1f. In Comparative Example 1g, the raw material graphite particles of Comparative Example 1f were packed into a rubber mold, pressed at a pressure of 1.5 t/cm$^2$ in a cold hydrostatic press, and the molded article thus obtained was crushed in a pin mill and passed through a 200-mesh sieve. The properties of these comparative examples were measured the same as in Examples 1o to 1t, the results of which are given in Table 6.

TABLE 6

|  | Comparative Example 1f | Comparative Example 1g |
| --- | --- | --- |
| Average particle size (μm) | 20.3 | 20.1 |
| Aspect ratio | 1.8 | 1.7 |
| True density (g/cm$^3$) | 2.242 | 2.241 |
| Bulk density (g/cm$^3$) | 0.650 | 0.750 |
| Spacing d002 (nm) | 0.335 | 0.335 |
| Specific surface area (m$^2$/g) | 2.7 | 3.9 |
| Pore volume (cm$^3$/g) | 0.86 | 0.53 |
| Peak intensity ratio (R = I$_{1360}$/I$_{1580}$) | 0.11 | 0.11 |
| Surface oxygen concentration (atom %) | 0.9 | 1.0 |

TABLE 6-continued

|  | Comparative Example 1f | Comparative Example 1g |
| --- | --- | --- |
| Electrode mix paste viscosity (Pa·s) | 2.78 | 1.9 |
| TI of electrode mix paste viscosity | 3.9 | 3.7 |

Structure of Raw Material Graphite Particles and Graphite Particles

Figure 3:
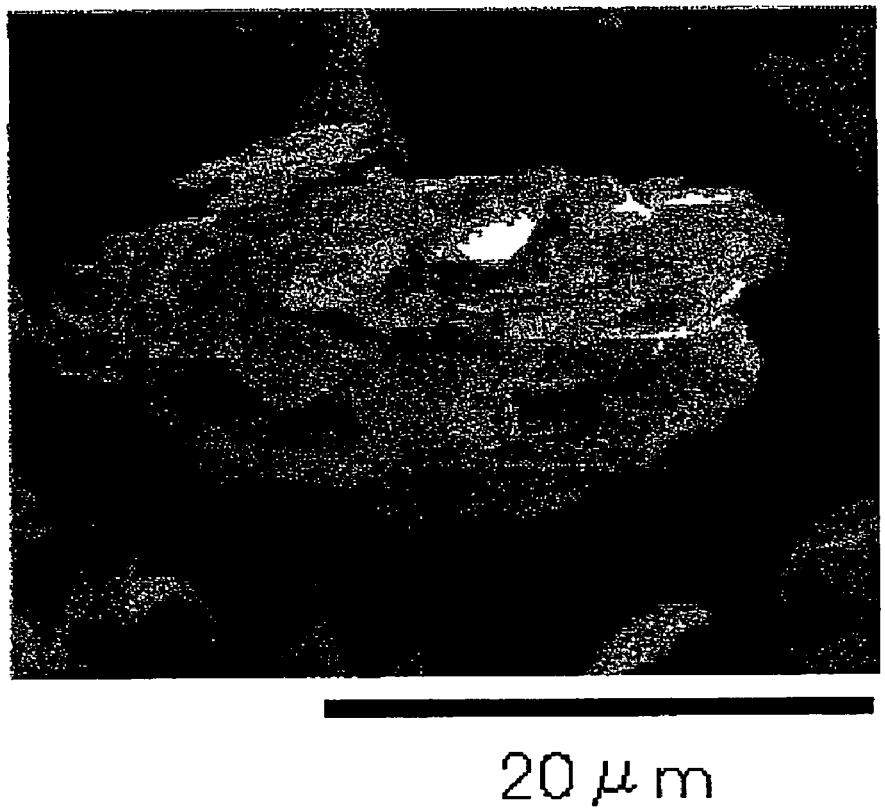
FIG. 3 is a diagram corresponding to a scanning electron micrograph (SEM) of the raw material graphite particles of the present invention.
Figure 4:
FIG. 4 is a diagram corresponding to a scanning electron micrograph (SEM) of the artificial graphite particles of the present invention.
Figure 5:
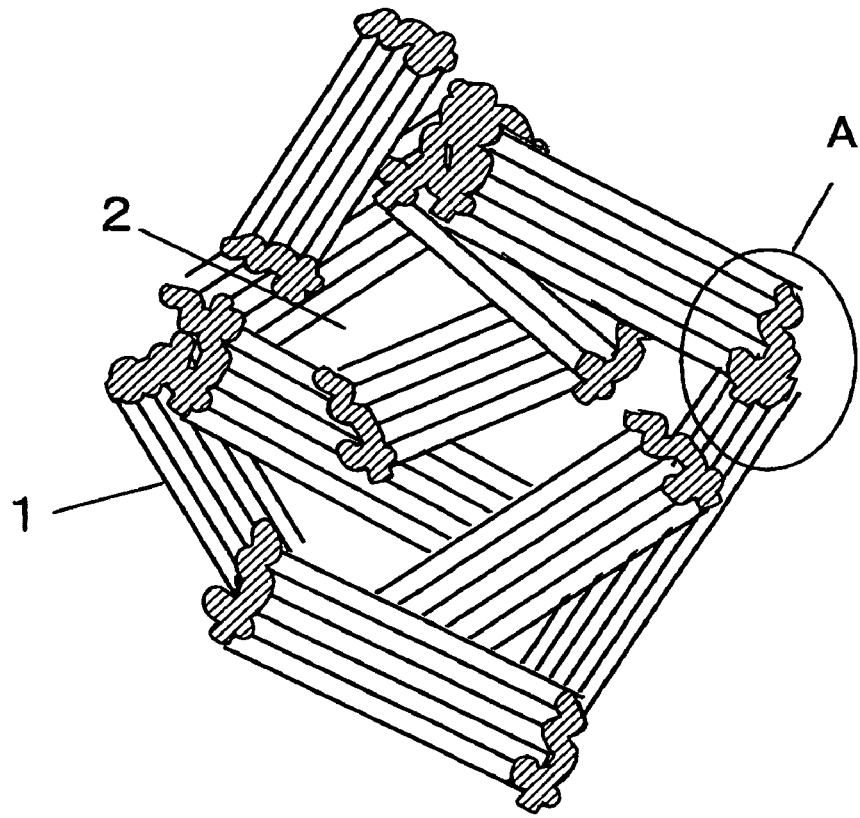
FIG. 5 is a schematic cross section of the artificial graphite particles of the present invention.

The raw material graphite particles and the artificial graphite particles of the present invention obtained in Example 1a were examined by scanning electron micrograph (SEM). The raw material graphite particles are shown in FIG. 3, while the artificial graphite particles of the present invention are shown in FIG. 4. As seen in FIG. 4, the structure (secondary particle structure) is such that the primary particles within the secondary particles that made up the artificial graphite particles of the present invention were clustered or bonded together so that the orientation planes were in a non-parallel manner. FIG. 5 shows the state of the secondary particles; in this secondary particle structure, primary particles composed of graphite 1 are clustered or bonded together, the planes of orientation of these primary particles are in a non-parallel manner with each other, and the secondary particles include voids 2 surrounded by primary particles.

Figure 6:
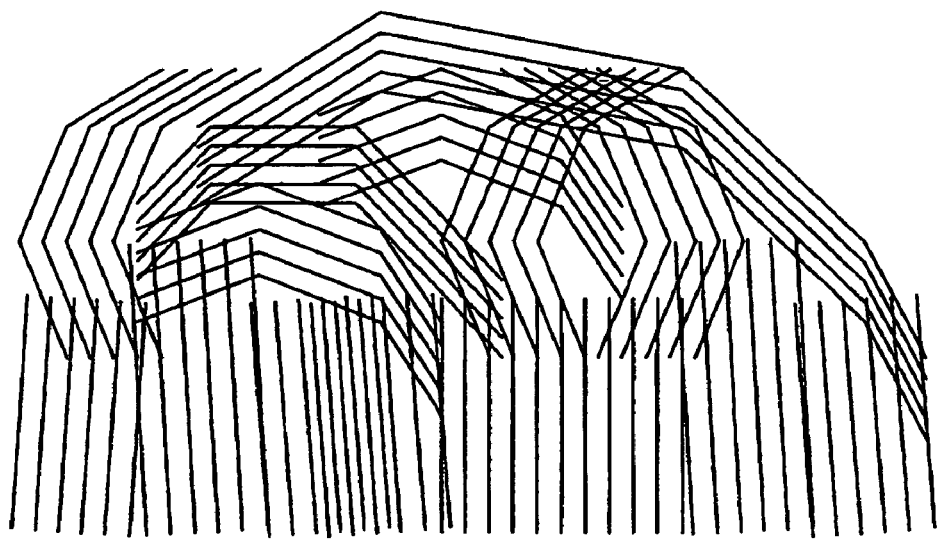
FIG. 6 is a schematic cross section of the artificial graphite particles of the present invention.

Further, the edge portions of the primary particles in the artificial graphite particles of the present invention were examined by transmission electron micrograph (TEM). As seen in the diagram of FIG. 6 and the TEM of FIG. 7, the edge portion has a layer structure in which the graphite layer is bent in a polyhedral shape. When lithium infiltrates into the artificial graphite particles of the present invention, even if the solvent molecules should cointercalate between the graphite layers, because the edge portions have this structure in which the graphite layers are bent in a polyhedral shape, the graphite layers spread out more readily than in graphite with high crystallinity, and therefore there is less effect of steric hindrance and solvent decomposition is minimized.

Thermal Analysis of Graphite Particles

Figure 8:
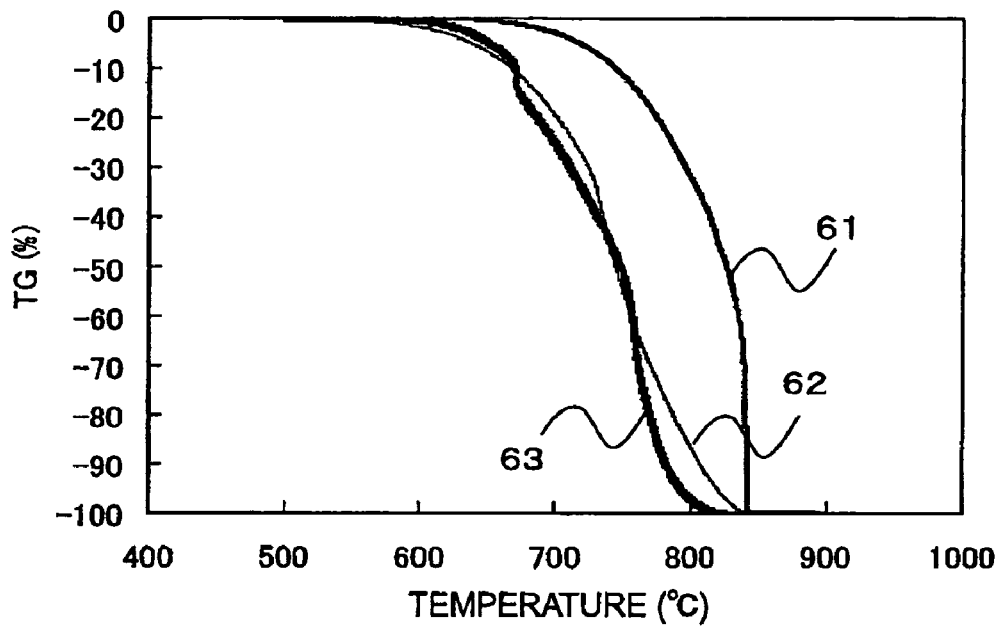
FIG. 8 is a graph of the thermogravimetric change (TG) in the artificial graphite particles of the present invention and conventional graphite particles.
Figure 9:
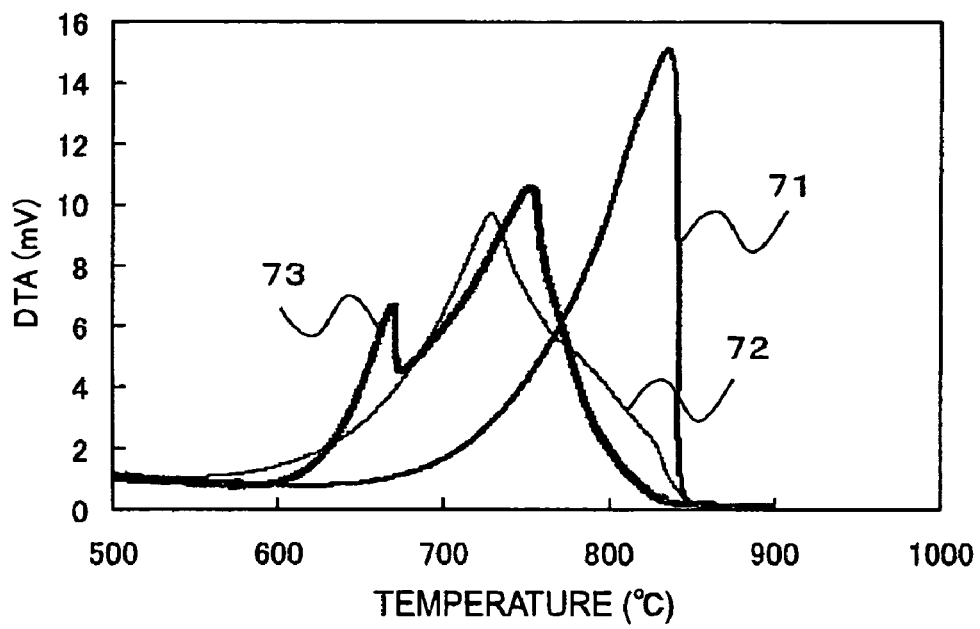
FIG. 9 is a graph of the differential thermal amount change (DTA) in the artificial graphite particles of the present invention and conventional graphite particles.

A TG/DTA6200 made by Seiko Denshi Kogyo was used to perform thermogravimetric-differential thermal analysis (TG-DTA) under an air flow for the artificial graphite particles of the present invention obtained in Example 1a (61 in FIG. 8, 71 in FIG. 9), the artificial graphite particles of Comparative Example 1a (62 in FIG. 8, 72 in FIG. 9), and the graphite particles comprising natural graphite covered with amorphous carbon of Comparative Example 2 (63 in FIG. 8, 73 in FIG. 9). The measurement conditions comprised an air (the atmosphere gas) flow of 200 cm$^3$/min, and heating from room temperature to 900° C. at a temperature elevation rate of 5° C./min. FIG. 8 shows the thermogravimetric change (TG), while FIG. 9 shows the differential thermal amount change (DTA). It can be seen that the graphite particles of Example 1a of the present invention had a higher exothermic commencement temperature and temperature at which calcination caused weight reduction (a temperature of about 640° C. or higher) than did the graphite particles in Comparative Examples 1a and 1b. Next, the weight reduction was examined when heating from room temperature to 650° C. was performed at a temperature elevation rate of 5° C./min and the temperature was held for 30 minutes at 650° C.

Figure 7:
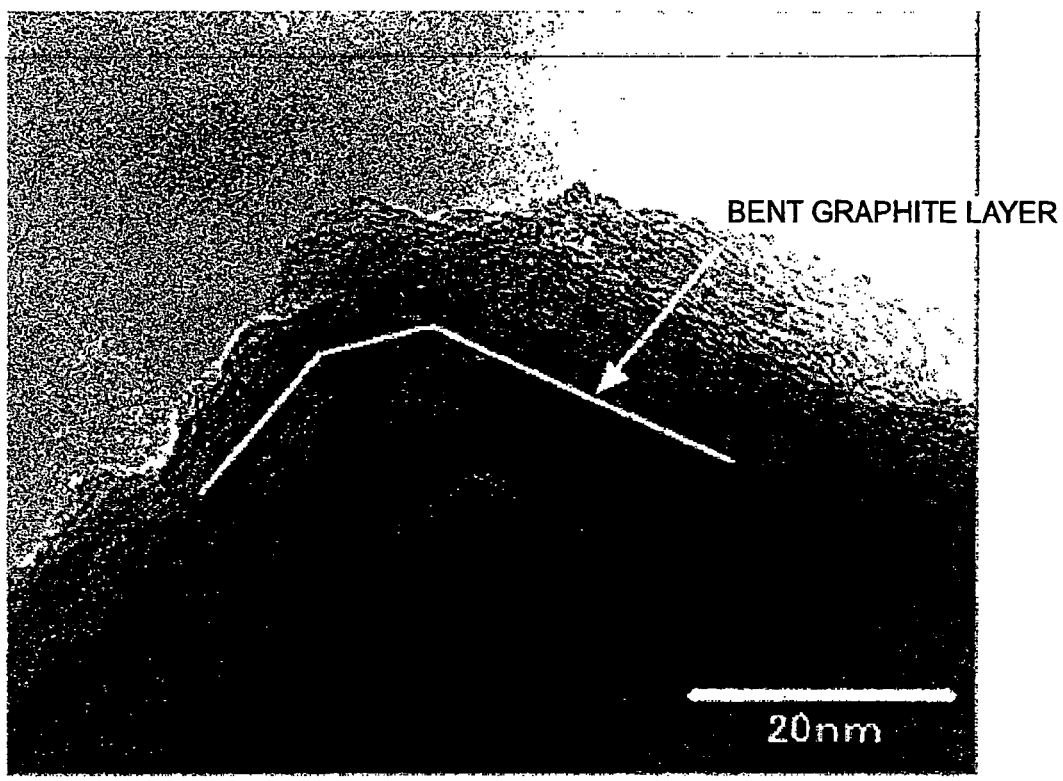
FIG. 7 is a diagram corresponding to a transmission electron micrograph (TEM) of the artificial graphite particles of the present invention.

The weight reduction in the graphite particles of Example 1a of the present invention, the artificial graphite particles of Comparative Example 1a, and the graphite particles comprising natural graphite covered with amorphous carbon of Comparative Example 1b was 2.8%, 5.1%, and 18.5%, respectively. It is believed that since the carbon materials of Comparative Examples 1a and 1b have low graphite crystallinity and the crystals inside the particles contain numerous defects or undeveloped amorphous portions, the exothermic commencement temperature is lower and the weight reduction is greater than with the artificial graphite particles of the present invention. On the other hand, it was found that with the artificial graphite particles of the present invention, the crystallinity is high and only the outermost surface is bent in a polyhedral shape and rendered amorphous. The artificial graphite particles of the present invention produced in Examples 1d to 1 g and the carbon materials of Comparative Examples 1c and 1d were subjected to TG-DTA by the same method as described above, and as a result it was found that, as shown in FIG. 7, the weight reduction was less than 3% when the artificial graphite particles of the present invention were held at 650° C. for 30 minutes, and was 5% or higher with the carbon materials of the comparative examples.

TABLE 7

| | Ex. 1a | Ex. 1d | Ex. 1e | Ex. 1f | Ex. 1g | CE 1a | CE 1b | CE 1c | CE 1d |
|---|---|---|---|---|---|---|---|---|---|
| Weight reduction (%) | 2.8 | 2.8 | 2.6 | 2.4 | 2.3 | 5.1 | 18.5 | 6.3 | 7.1 |

[CE: Comparative Example]

Electrolyte Decomposition Reaction in Nonaqueous Electrolyte Secondary Cell Negative Electrode Featuring Graphite Particles Example 2

A negative electrode was produced by the following method using the artificial graphite particles of the present invention obtained in Example 1a. Polyvinylidene fluoride (PVDF) was added in an amount of 10 wt % as a binder to 90 wt % the artificial graphite particles of the present invention, and a suitable amount of N-methyl-2-pyrrolidone (NMP) was added as a solvent to create a paste. A collector (a copper foil) was coated with this paste in an amount of 11 mg/cm$^2$ per unit of surface area, after which the NMP was removed by drying. Press molding was then performed so that the density of the negative electrode mix would be 1.5 g/cm$^3$, and this product was used as a negative electrode.

Figure 10:
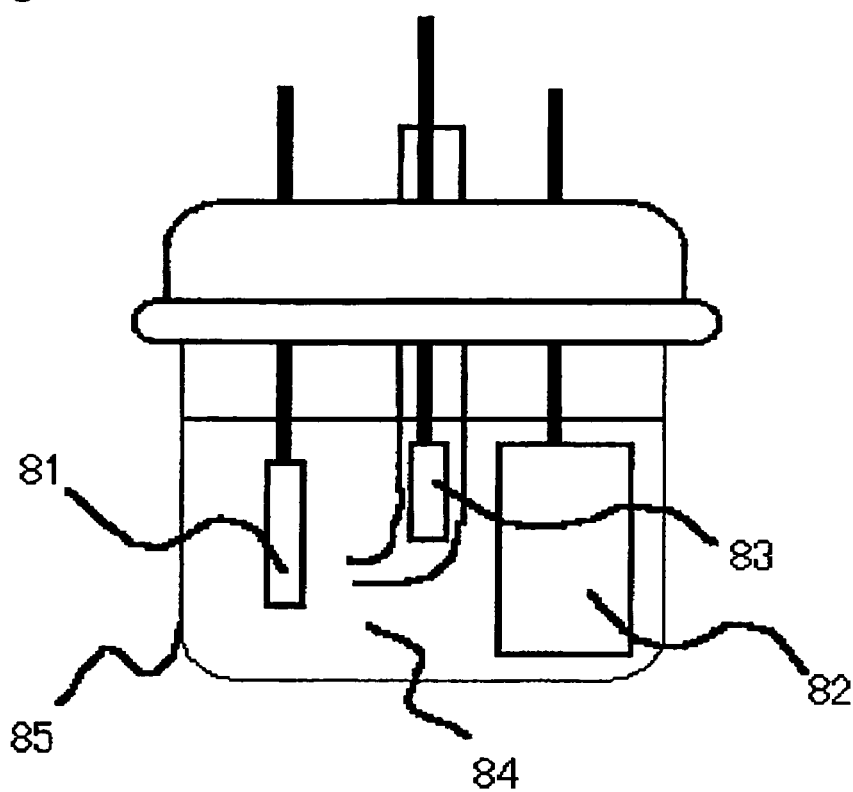
FIG. 10 is a diagram of the electrochemical cell used in the present invention.

The decomposition reaction of the electrode was examined by cyclic voltammetry for the negative electrode of the present invention obtained above, using an electrochemical cell in which metallic lithium was used for the counter electrode and the reference electrode. FIG. 10 shows a model cell used to evaluate the electrochemical characteristics of the negative electrode in the present invention. In FIG. 10, 81 is a negative electrode, 82 is a metallic lithium counter electrode, 83 is a metallic lithium reference electrode, 84 is electrolyte, and 85 is a glass container. Evaluation was performed using a three-pole electrochemical cell in which metallic lithium served as the standard potential. The electrolyte 84 comprised a solution obtained by dissolving LiPF$_6$ in an amount of 1 mol/dm$^3$ in a mixed solvent of ethylene carbonate (EC) and ethyl methyl carbonate (EMC) with a volumetric ratio of 1:1.

Comparative Example 2

The decomposition reaction of the electrode was examined by cyclic voltammetry in the same manner as in Example 2, using the artificial graphite particles with an average particle size of 25 μm of Comparative Example 1a.

Figure 11:
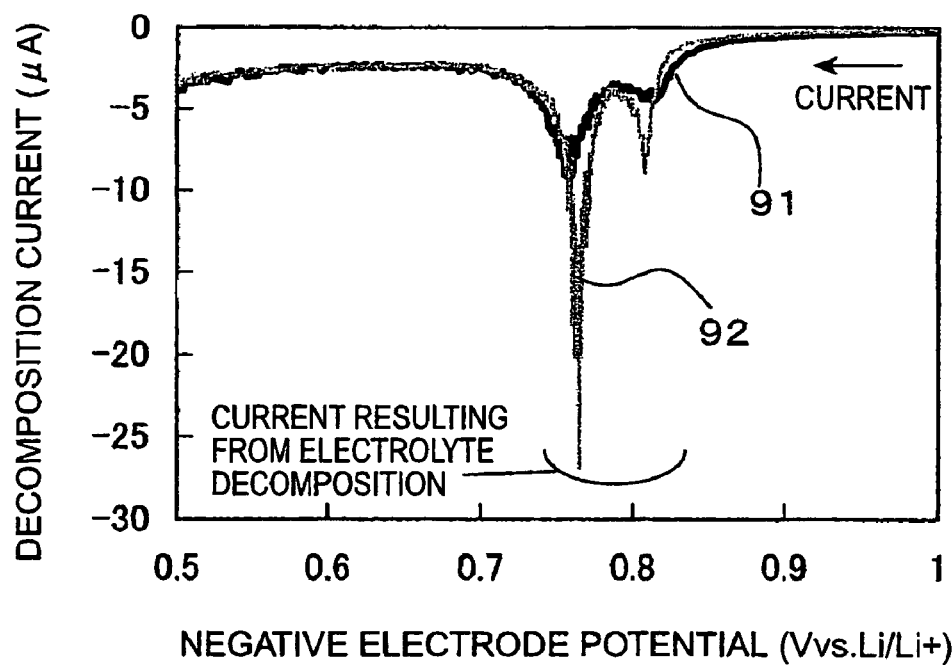
FIG. 11 shows a cyclic voltammogram produced in Example 2 and Comparative Example 2.

FIG. 11 is a shows a cyclic voltammogram illustrating the electrolyte decomposition reaction. In FIG. 11, 91 is the result of Example 2 and 92 is the result of Comparative Example 5. A comparison of the reduction current resulting from electrolyte decomposition at about 0.8 V shows it to be smaller with Example 2 than with Comparative Example 2, and therefore there is less electrolyte decomposition reaction with the artificial graphite particles of the present invention.

Evaluation of Nonaqueous Electrolyte Secondary Cell Negative Electrode In Which Graphite Particles Are Used Example 3a A negative electrode was produced in the same manner as in Example 2, and the charging and discharging characteristics of the artificial graphite particles of the present invention produced in Examples 1a to 1 g were evaluated using the same electrochemical cell as that used in Example 2. "Charging" as used here refers to the occlusion of lithium into the negative electrode, while "discharging" refers to the release of lithium from the negative electrode. In the charging of the negative electrode, first constant current charging was performed at 0.5 mA/cm$^2$, then constant voltage charging was performed at 5 mV from the point when the negative electrode potential reached 5 mV, and the charging was concluded at the point when the charging current attenuated to 0.02 mA/cm$^2$. In the discharging of the negative electrode, constant current charging was performed at 0.5 mA/cm$^2$, and the discharging was concluded at the point when the negative electrode potential reached 1.5 V. The irreversible capacity was found by subtracting the initial discharge capacity from the initial charge capacity.

Comparative Example 3a

The charging and discharging characteristics of the conventional graphite particles used in Comparative Examples 1a to 1d were evaluated in the same manner as in Example 3.

Table 8 shows the results of evaluating the charging and discharging characteristics pertaining to irreversible capacity and initial discharge capacity when the artificial graphite particles of the present invention were used in Example 3a, and the results of evaluating the charging and discharging characteristics pertaining to irreversible capacity and initial discharge capacity when the conventional graphite particles in Comparative Example 3a were used.

The graphite particles of the present invention all had smaller irreversible capacity than the artificial graphite of Comparative Example 1a and the graphite particles produced in Comparative Examples 1c and 1d, and had larger discharge capacity and superior negative electrode characteristics compared to Comparative Example 1b. Further, Examples 1a, 1d, 1e, 1f, and 1 g, in which the size of the grinder gap was between 0.5 and 20 times the average size of the raw material graphite particles used in the manufacture of the artificial graphite particles of the present invention, were preferable because the discharge capacity was large and the irreversible capacity was particularly small.

TABLE 8

|  | Example 3a | | | | | Comparative Example 3a | | | |
|---|---|---|---|---|---|---|---|---|---|
| Graphite particles used in negative electrode | | | | | | | | | |
|  | Ex. 1a | Ex. 1d | Ex. 1e | Ex. 1f | Ex. 1g | CE 1a | CE 1b | CE 1c | CE 1d |
| Discharge capacity (mAh/g) | 362 | 365 | 367 | 364 | 363 | 365 | 321 | 330 | 345 |
| Irreversible capacity (mAh/g) | 28 | 26 | 27 | 27 | 28 | 55 | 30 | 60 | 55 |

[CE: Comparative Example]

Example 3b

The graphite particles of Examples 1h to 1k and the raw material graphite particles of Comparative Example 1e were evaluated when used in a lithium ion secondary cell negative electrode under the conditions given in Table 9. These results are given in Table 10.

TABLE 9

| Category | Conditions |
|---|---|
| Cell | 2-pole (counter electrode: metallic lithium) |
| Sample weight | 8 mg |
| Electrode surface area | 2.5 cm$^2$ |
| Binder | polyvinylidene fluoride (#1120 made by Kureha), 10 wt % |
| Solvent used to prepare electrode mix paste | N-methyl-2-pyrrolidone |
| Drying conditions | 110° C., 5 hours, in the atmosphere |
| Electrolyte | 1 M LiPF$_6$ ethylene carbonate/methyl ethyl carbonate (1/1) |
| Charging conditions | constant current charging 0.2 mA constant voltage charging 0 V, 0.02 mA |
| Discharging conditions | current 0.2 mA cutoff voltage 1.5 V |

TABLE 10

| | Charging and discharging characteristics (1$^{st}$ cycle) | | | | |
|---|---|---|---|---|---|
| | Ex. 1h | Ex. 1i | Ex. 1j | Ex. 1k | CE 1e |
| Charge capacity (mAh/g) | 400 | 398 | 396 | 395 | 394 |
| Discharge capacity (mAh/g) | 371 | 368 | 366 | 363 | 359 |
| Irreversible capacity (mAh/g) | 29 | 30 | 30 | 32 | 35 |
| Cycling efficiency (%) | 92.8 | 92.5 | 92.4 | 91.9 | 91.1 |

[CE: Comparative Example]

Example 3c

The graphite particles of Examples 1o to 1t and Comparative Examples 1f and 1g were evaluated when used in a lithium ion secondary cell negative electrode under the conditions given in Table 9. These results are given in

TABLE 11

| | Charging and discharging characteristics (1$^{st}$ cycle) | | | | | | | |
|---|---|---|---|---|---|---|---|---|
| | Ex. 1o | Ex. 1p | Ex. 1q | Ex. 1r | Ex. 1s | Ex. 1t | CE 1f | CE 1g |
| Charge capacity (mAh/g) | 394 | 395 | 393 | 393 | 397 | 395 | 399 | 394 |
| Discharge capacity (mAh/g) | 363 | 365 | 361 | 362 | 362 | 363 | 362 | 359 |
| Irreversible capacity (mAh/g) | 31 | 30 | 32 | 31 | 33 | 32 | 37 | 35 |
| Cycling efficiency (%) | 92.1 | 92.4 | 91.9 | 92.1 | 91.2 | 91.9 | 90.7 | 91.1 |

[CE: Comparative Example]

Lithium Secondary Cell Having Nonaqueous Electrolyte Secondary Cell Negative Electrode Made From Graphite Particles

Example 4a

The lithium secondary cell of the present invention was produced as follows, using the artificial graphite particles of the present invention produced in Examples 1a to 1g as the negative electrode active material.

The artificial graphite particles of the present invention were combined with polyvinylidene fluoride (PVDF; used as a binder) in proportions (weight ratio) of 90% and 10%, respectively, and N-methyl-2-pyrrolidone (NMP) was added as a solvent to prepare a negative electrode mix paste. One side of a copper foil with a thickness of 10 μm was coated with this negative electrode mix paste in an amount of 11 mg/cm$^2$ per unit of surface area, with this coating applied intermittently, leaving uncoated portions at regular intervals. After this, the negative electrode mix paste was dried to remove the NMP and form a negative electrode mix film. A negative electrode mix film was similarly formed on the other side of the copper foil, which yielded a coated electrode. The mix-coated and uncoated portions on both sides of the copper foil were made to match up with each other in this coating. After this, the coated electrode was press molded in a roll press until the density of the negative electrode mix was 1.5 g/cm$^3$, which produced a negative electrode sheet. This negative electrode sheet was cut into a long strip, so that the end of the cut negative electrode sheet was uncoated copper foil. A negative electrode tab was attached to this copper foil portion by ultrasonic welding.

Meanwhile, a positive electrode mix paste was prepared by using an active material expressed by the chemical formula $LiCoO_2$ for the positive electrode, combining this positive electrode active material with polyvinylidene fluoride (PVDF; used as a binder) and carbon black (used as a conducting aid) in proportions (weight ratio) of 90%, 5%, and 5%, respectively, and adding N-methyl-2-pyrrolidone (NMP) as a solvent. One side of an aluminum foil with a thickness of 20 μm was coated with this positive electrode mix paste in an amount of 24 mg/cm$^2$ per unit of surface area, with this coating applied intermittently, leaving uncoated portions at regular intervals. After this, the positive electrode mix paste coating was dried to remove the NMP and form a positive electrode mix film. A positive electrode mix film was similarly formed on the other side of the aluminum foil, which yielded a coated electrode. The mix-coated and uncoated portions on both sides of the aluminum foil were made to match up with each other in this coating. After this, the coated electrode was press molded in a roll press until the density of the positive electrode mix was 3.3 g/cm$^3$, which produced a positive electrode sheet. This positive electrode sheet was cut into a long strip, so that the end of the cut positive electrode sheet was uncoated aluminum foil. A positive electrode tab was attached to this aluminum foil portion by ultrasonic welding.

The above-mentioned negative and positive electrodes and a separator consisting of a microporous film of polyethylene were laminated in the order of negative electrode, separator, positive electrode, and separator, and these were coiled to form an electrode group. The positive electrode tab and the negative electrode tab were the top and bottom of the coiled group, respectively. This electrode group was installed in a cell can, and the positive electrode tab was connected by spot welding to the cell inner lid, and the negative electrode tab to the cell can.

The electrolyte was a solution obtained by dissolving $LiPF_6$ in an amount of 1 mol/dm$^3$ in a mixed solvent of ethylene carbonate (EC) and ethyl methyl carbonate (EMC) with a volumetric ratio of 1:1.

The electrolyte was poured into the cell can, after which the cell lid was attached to the cell can to produce the AA-size cylindrical lithium secondary cell of the present invention.

Comparative Example 4a

An AA-size cylindrical lithium secondary cell was produced in the same manner as in Example 4a, but using the conventional graphite particles of Comparative Examples 1a to 1d.

A charging and discharging test was conducted using the lithium secondary cells produced in Example 4a and Comparative Example 4a. Initial charging was conducted at a constant current of 120 mA (equivalent to 0.2 C), then charging was performed at a constant voltage of 4.2 V after the cell voltage reached 4.2 V, which was concluded at the point when the charging time reached 7 hours. Meanwhile, initial discharging was performed at a constant current of 120 mA (equivalent to 0.2 C), and was concluded at the point when the cell voltage reached 3.0 V.

Charging and discharging were performed for three cycles under the above conditions, after which the discharge current was changed to 600 mA (equivalent to 1 C) and 1200 mA (equivalent to 2 C) on the fourth and fifth cycles, and the load characteristics were examined.

Further, the cycle of constant current and constant voltage charging followed by constant current discharging was repeated as above, with the charging current set to 600 mA (equivalent to 1 C), the end time to 2.5 hours, and the discharging current to 600 mA (equivalent to 1 C).

Tables 12 and 13 show the initial discharge capacity of the lithium secondary cells produced in Example 4a and Comparative Example 4a, the coulomb efficiency in initial charging and discharging, the capacity retention at 1 C and 2 C discharge versus 0.2 C discharge, and the capacity retention after 300 cycles versus initial discharge. It can be seen that the lithium secondary cells of the present invention exhibited larger discharge capacity, higher initial coulomb efficiency, and superior load characteristics and cycling characteristics as compared to the conventional lithium secondary cells.

TABLE 12

|  | Example 4a Graphite particles used for negative electrode | | | | |
| --- | --- | --- | --- | --- | --- |
|  | Ex. 1a | Ex. 1d | Ex. 1e | Ex. 1f | Ex. 1g |
| Initial discharging capacity (mAh/g) | 621 | 624 | 627 | 629 | 629 |
| Coulomb efficiency in initial charging (%) | 92.7 | 93.2 | 93.1 | 93.1 | 92.5 |
| Capacity retention in 1 C discharge versus 0.2 C discharge (%) | 98.3 | 98.3 | 98.5 | 98.6 | 98.6 |
| Capacity retention in 2 C discharge versus 0.2 C discharge (%) | 93.7 | 94.8 | 95.2 | 95.0 | 95.3 |
| Capacity retention after 300 cycles versus initial discharge (%) | 89.3 | 91.5 | 88.7 | 90.1 | 90.5 |

TABLE 13

| Graphite particles used | Comparative Example 4a | | | |
| --- | --- | --- | --- | --- |
| for negative electrode | CE 1a | CE 1b | CE 1c | CE 1d |
| Initial discharging capacity (mAh/g) | 581 | 545 | 512 | 553 |
| Coulomb efficiency in initial charging (%) | 86.6 | 91.0 | 84.0 | 86.2 |
| Capacity retention in 1 C discharge versus 0.2 C discharge (%) | 94.2 | 93.8 | 95.2 | 93.2 |
| Capacity retention in 2 C discharge versus 0.2 C discharge (%) | 87.2 | 85.3 | 84.9 | 87.9 |
| Capacity retention after 300 cycles versus initial discharge (%) | 81.1 | 82.3 | 75.2 | 78.6 |

[CE: Comparative Example]

Further, using the lithium secondary cells produced in Example 4a and Comparative Example 4a, charge receptability was evaluated according to the capacity that can be achieved in constant current charging until the charging voltage reached 4.2 V at a maximum current of 1200 mA (equivalent to 2 C). Table 14 shows the quick charging capacity in charging by the method described above. It can be seen from Table 14 that the lithium secondary cells of the present invention exhibited larger charging capacity and superior charging receptability as compared to the conventional lithium secondary cells.

TABLE 14

| | Example 4a | | | | | Comparative Ex. 4a | | | |
|---|---|---|---|---|---|---|---|---|---|
| | Graphite particles used for negative electrode | | | | | | | | |
| | Ex. 1a | Ex. 1d | Ex. 1e | Ex. 1f | Ex. 1g | CE 1a | CE 1b | CE 1c | CE 1d |
| Quick charging capacity (mAh/g) | 313 | 341 | 338 | 295 | 289 | 153 | 185 | 120 | 137 |

[CE: Comparative Example]

Example 4b

The lithium deposition state on the negative electrode surface after overcharging was examined by the following method for the lithium secondary cell of the present invention produced using the negative electrode material of Example 1a in Example 4a and for the conventional lithium secondary cell produced using the artificial graphite of Comparative Example 1a in Comparative Example 4a. Using the above-mentioned lithium secondary cell of the present invention and conventional lithium secondary cell, first constant current charging was performed at 120 mA (equivalent to 0.2 C), then charging was performed at a constant voltage of 4.2 V from the point when the cell voltage reached 4.2 V, which was concluded at the point when the charging time reached 7 hours. Next, a state of overcharge was achieved by charging for 5 minutes at a constant current of 1200 mA (equivalent to 2 C). These cells were disassembled and their negative electrodes removed, and the state of lithium deposition on the negative electrode surface was examined by scanning electron micrograph (SEM).

Figure 12:
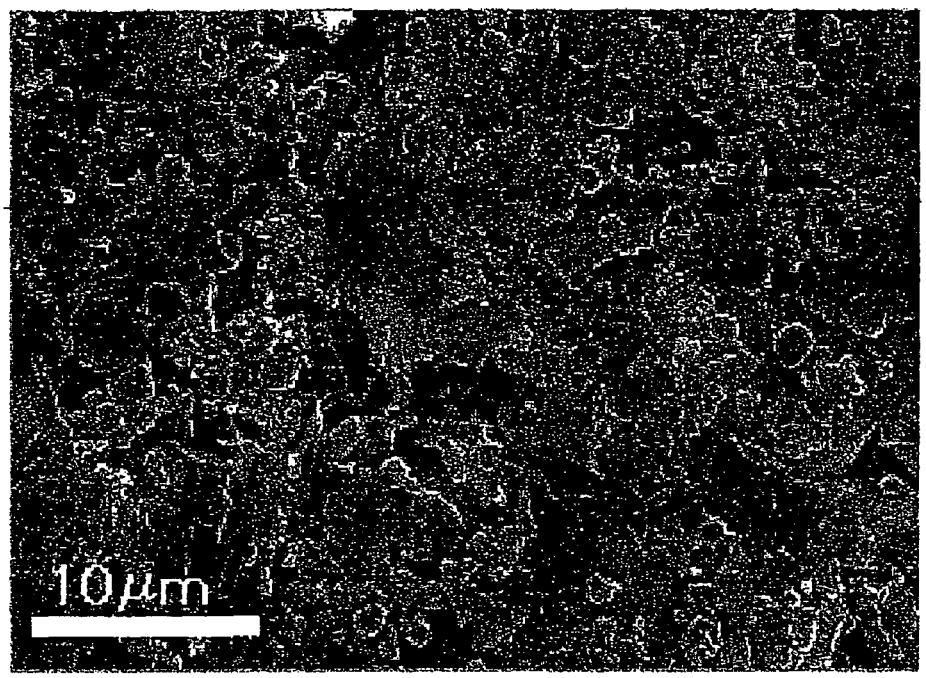
FIG. 12 is a diagram corresponding to a scanning electron micrograph (SEM) of the lithium secondary cell negative electrode of the present invention in an overcharged state.
Figure 13:
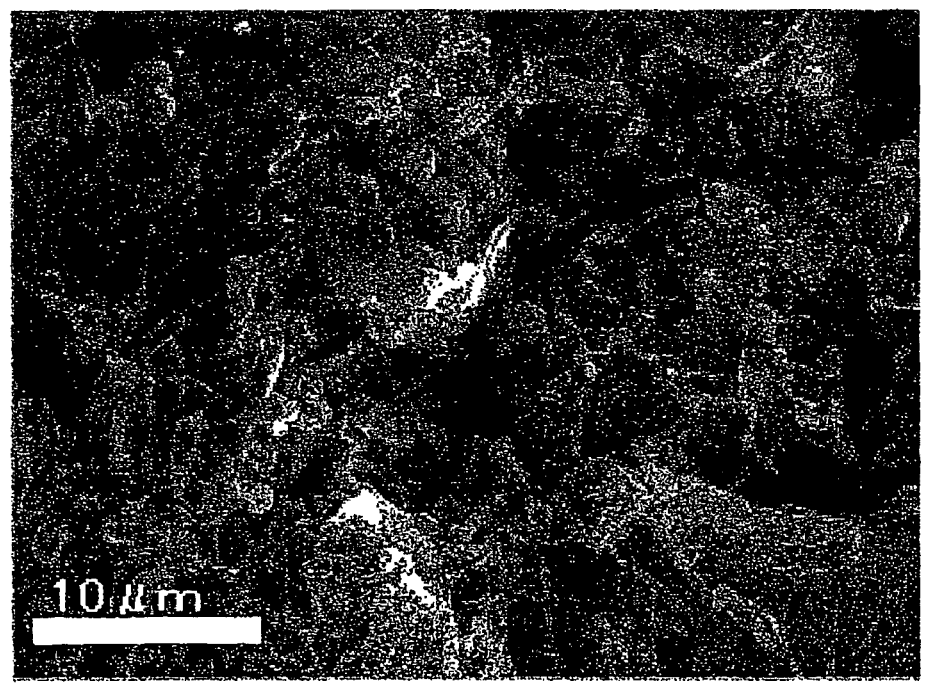
FIG. 13 is a diagram corresponding to a scanning electron micrograph (SEM) of a conventional lithium secondary cell negative electrode in an overcharged state.
Figure 14:
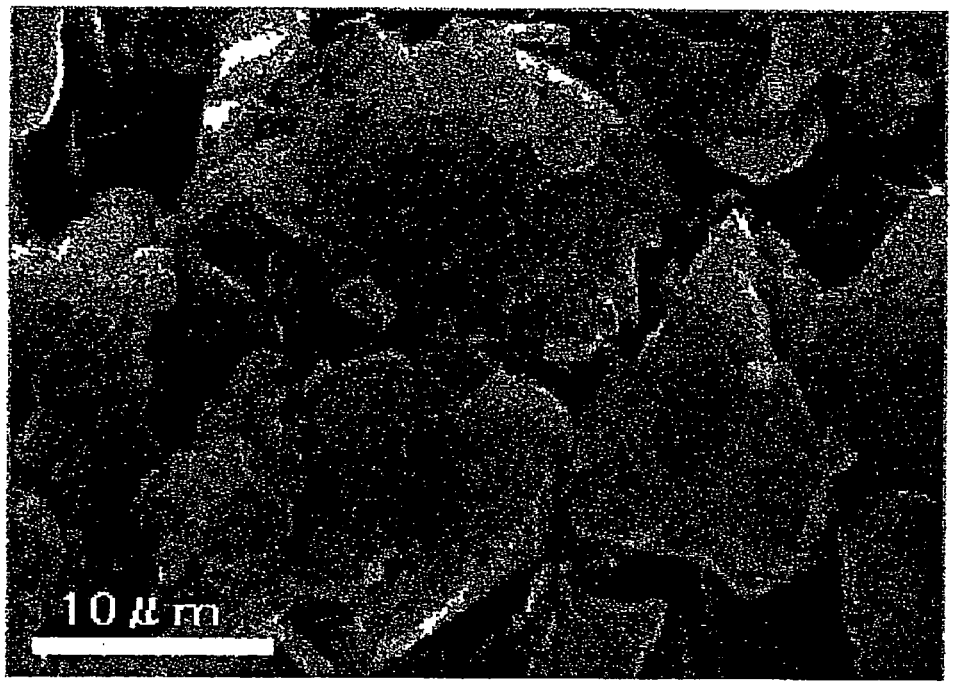
FIG. 14 is a diagram corresponding to a scanning electron micrograph (SEM) of an unused lithium secondary cell negative electrode of the present invention.
Figure 15:
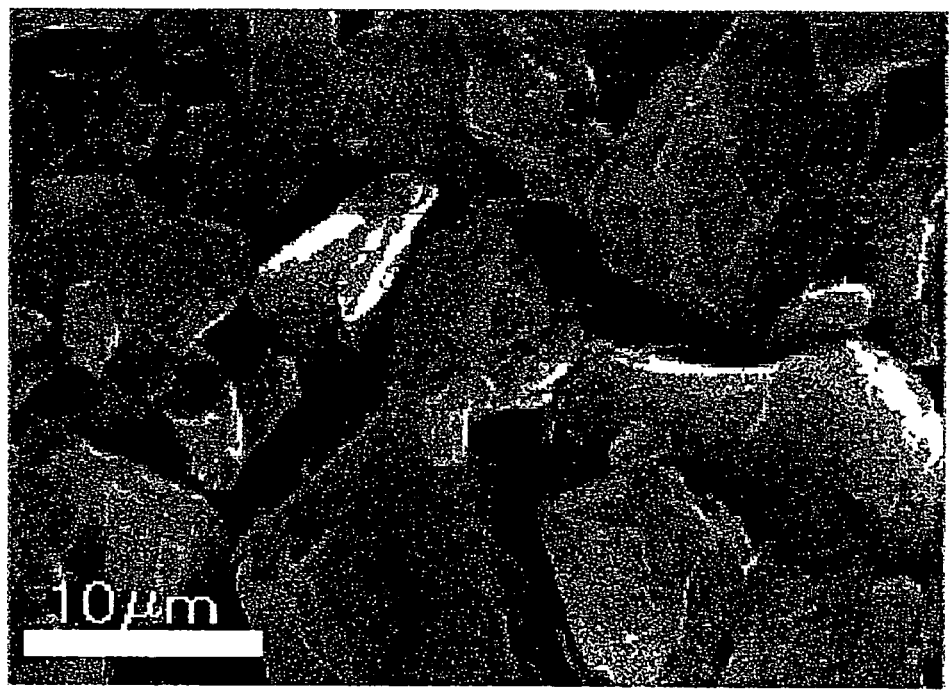
FIG. 15 is a diagram corresponding to a scanning electron micrograph (SEM) of an unused conventional lithium secondary cell negative electrode.

FIG. 12 shows the state of the negative electrode of the lithium secondary cell of the present invention in this overcharged state, while FIG. 13 shows the state of the negative electrode in the conventional lithium secondary cell. For the sake of reference, FIGS. 14 and 15 show unused electrodes of each, on which no lithium has been deposited. A comparison of the SEM images before and after overcharging reveals deposited lithium on the negative electrode in the overcharged state, and it can be seen in the SEM image in FIG. 12 that lithium was deposited in the form of particles on the negative electrode of the lithium secondary cell of the present invention, and these particles stuck together to give the appearance of moss, whereas the lithium was deposited in dendritic form on the negative electrode of the conventional lithium secondary cell. Thus, it can be seen that dendritic deposition of lithium is suppressed when the artificial graphite particles of the present invention are used for the negative electrode material.

INDUSTRIAL APPLICABILITY

As described above, the present invention provides artificial graphite particles and a method for manufacturing the same, with which the electrolyte decomposition reaction in initial charging is suppressed and irreversible capacity is reduced, without sacrificing the advantage of a graphite negative electrode of being capable of occluding and releasing a large amount of lithium, thereby increasing the capacity of a lithium secondary cell, and provides a nonaqueous electrolyte secondary cell negative electrode in which these artificial graphite particles are used, and a method for manufacturing this electrode, as well as a lithium secondary cell that makes use of this nonaqueous electrolyte-secondary cell negative electrode.

The lithium secondary cell of the present invention, in which the artificial graphite particles of the present invention are used as a lithium secondary cell negative electrode material, has large capacity, excellent quick charging and discharging characteristics, and very little cycling deterioration. Furthermore, the artificial graphite particles of the present invention undergo little electrolyte decomposition, and the irreversible capacity is small, electrode coatability and electrode adhesion are excellent, which makes possible the above-mentioned improvements in a lithium secondary cell. Also, the method for manufacturing artificial graphite particles of the present invention comprises a simple manufacturing process and allows a large quantity of artificial graphite particles to be manufactured.

Finally, coatability and adhesion of the negative electrode active material are improved, and quick charging and discharging characteristics and cycling characteristics can be enhanced with the present invention, so the present invention provides a lithium secondary cell that is favorable for cellular telephones, notebook personal computers, and other such portable devices, electric automobiles, power storage devices, and so forth.

The invention claimed is:

1. Artificial graphite particles having secondary particles, the secondary particles comprising a plurality of primary particles,
   wherein the primary particles are composed of graphite and bonded together to form the secondary particles; wherein edge portions of the primary particles are bent in a polyhedral shape; wherein the edge portions of the primary particles in polyhedral shape are disposed only on an outermost surface of the secondary particles, which allow edge portions of the secondary particles forming the artificial graphite particles to be bent in a polyhedral shape; and wherein a specific surface area of the artificial graphite particles is 3 to 6 $m^2/g$.

2. The artificial graphite particles according to claim 1, wherein the outermost surface of the secondary particles has a surface layer in a low-crystallinity or amorphous state.

3. The artificial graphite particles according to claim 1, wherein the secondary particle structure is one in which a plurality of primary particles composed of graphite are bonded together in a non-parallel manner, and the structure has voids inside the secondary particles.

4. The artificial graphite particles according to claim 1, wherein the bulk density is at least 0.8 $g/cm^3$ and the surface oxygen concentration as measured by x-ray photon spectrometry (XPS) is 1.0 to 4.0 atom %.

5. The artificial graphite particles according to claim 4, wherein the surface oxygen concentration is 1.0 to 3.0 atom %.

6. The artificial graphite particles according to claim 1, wherein the peak intensity ration ($R=I_{1360}/I_{1580}$) between the peak ($I_{1360}$) appearing at 1360 cm$^{-1}$ and the peak ($I_{1580}$) appearing at 1580 cm$^{-1}$ in Raman spectrum measurement is 0.1 to 0.5 ($0.1 \leq R \leq 0.5$).

7. The artificial graphite particles according to claim 6, wherein the peak intensity ratio ($R=I_{1360}/I_{1580}$) is 0.1 to 0.4 ($0.1 \leq R \leq 0.4$).

8. The artificial graphite particles according to claim 1, wherein weight reduction and heat generation occur at a temperature of at least 640° C., and the weight reduction caused by heating for 30 minutes at 650° is less than 3%, in thermogravimetric-differential thermal analysis (TG-DTA) under an air flow.

9. The artificial graphite particles according to claim 1, wherein the pore volume measured by mercury porosimetry is 0.1 to 0.5 cm$^3$/g.

10. The artificial graphite particles according to claim 1, wherein the spacing d002 of the (002) plane in the graphite is less than 0.337 nm, the average particle size is 10 to 50 μm, and the true density is at least 2.2 g/cm$^3$.

11. The artificial graphite particles according to claim 1, wherein an electrode mix paste obtained by kneading the artificial graphite particles with binder (a) and solvent (b) has a viscosity of 0.3 to 1.6 Pa·s at a temperature of 25° C. and a shear rate of 4 sec$^{-1}$;
 (a) polyvinylidene fluoride, where the weight ratio of the binder to the artificial graphite particles is 1:9, and the polyvinylidene fluoride is a polyvinylidene fluoride that exhibits a solution viscosity of 550±100 mPa·s when 12.0±0.5 wt % N-methyl-2-pyrrolidone solution is produced,
 (b) N-methyl-2-pyrrolidone, in a weight of 45% with respect to the total amount of the paste.

12. The artificial graphite particles according to claim 11, wherein the viscosity is 1.0 to 1.3 Pa·s.

13. The artificial graphite particles according to claim 1, wherein an electrode mix paste has a shear rate dependence (TI) of viscosity at 25° C. of 2.0 to 4.0, the paste being obtained by kneading the artificial graphite particles with binder (a) and solvent (b) and the paste having a viscosity of 1.0 Pa·s at 25° C. and a shear rate of 4 sec$^{-1}$, where TI is defined by the formula TI=(viscosity at shear rate of 4 sec$^{-1}$)/(viscosity at shear rate of 40 sec$^{-1}$):
 (a) polyvinylidene fluoride, where the weight ratio of the binder to the artificial graphite particles is 1:9, and the polyvinylidene fluoride is a polyvinylidene fluoride that exhibits a solution viscosity of 550±100 mPa·s when 12.0±0.5 wt % N-methyl-2-pyrrolidone solution is produced,
 (b) N-methyl-2-pyrrolidone.

14. The artificial graphite particles according to claim 13, wherein the shear rate dependence (TI) is 2.0 to 3.5.

15. The artificial graphite particles according to claim 13, wherein the shear rate dependence (TI) is 2.6 to 3.0.

16. A nonaqueous electrolyte secondary cell negative electrode having graphite particles that occlude or release alkali metal ions, affixed by an organic binder to a metal foil surface, wherein the graphite particles are composed of the artificial graphite particles according to claim 1.

17. A lithium secondary cell having a laminate, produced by the successive lamination of a negative electrode capable of occluding and releasing lithium, a separator, and a positive electrode capable of occluding and releasing lithium, and a nonaqueous electrolyte in a container, wherein the negative electrodes comprise the negative electrode according to claim 16.

18. The lithium secondary cell according to claim 17, wherein the lithium occluded on the surface of the graphite particles is deposited in the form of particles or moss.

19. The artificial graphite particles according to claim 2, wherein the secondary particle structure is one in which a plurality of primary particles composed of graphite are clustered or bonded together in a non-parallel manner, and the structure has voids inside the secondary particles.

* * * * *